(12) United States Patent
Barros et al.

(10) Patent No.: US 12,027,164 B2
(45) Date of Patent: Jul. 2, 2024

(54) PASSIVE DISAMBIGUATION OF ASSISTANT COMMANDS

(71) Applicant: GOOGLE LLC, Mountain View, CA (US)

(72) Inventors: Brett Barros, San Mateo, CA (US); Theo Goguely, Mill Valley, CA (US)

(73) Assignee: GOOGLE LLC, Mountain View, CA (US)

( * ) Notice: Subject to any disclaimer, the term of this patent is extended or adjusted under 35 U.S.C. 154(b) by 451 days.

(21) Appl. No.: 17/348,929

(22) Filed: Jun. 16, 2021

(65) Prior Publication Data

US 2022/0406301 A1 Dec. 22, 2022

(51) Int. Cl.
*G10L 15/08* (2006.01)
*G06F 3/0482* (2013.01)
(Continued)

(52) U.S. Cl.
CPC ............ *G10L 15/22* (2013.01); *G06F 3/0482* (2013.01); *G06F 3/04842* (2013.01); *G06F 3/167* (2013.01); *G06F 40/295* (2020.01); *G10L 15/083* (2013.01); *G10L 15/18* (2013.01); *G10L 15/1822* (2013.01); *G10L 15/1815* (2013.01);
(Continued)

(58) Field of Classification Search
USPC ............................... 704/1–275; 715/727–730
See application file for complete search history.

(56) References Cited

U.S. PATENT DOCUMENTS

| 10,249,297 | B2 * | 4/2019 | Khan | ...................... G10L 15/08 |
| 11,003,839 | B1 * | 5/2021 | Hatch | ................... G06F 40/166 |

(Continued)

FOREIGN PATENT DOCUMENTS

| CN | 112099720 | 12/2020 |
| DK | 201870359 | 1/2020 |
| WO | 2020139408 | 7/2020 |

OTHER PUBLICATIONS

European Patent Office; International Search Report and Written Opinion of Application No. PCT/US2021/062610; 18 pages; dated Mar. 31, 2022.

(Continued)

*Primary Examiner* — Marcellus J Augustin
(74) *Attorney, Agent, or Firm* — Gray Ice Higdon

(57) ABSTRACT

Implementations set forth herein relate to an automated assistant that can initialize execution of an assistant command associated with an interpretation that is predicted to be responsive to a user input, while simultaneously providing suggestions for alternative assistant command(s) associated with alternative interpretation(s) that is/are also predicted to be responsive to the user input. The alternative assistant command(s) that are suggested can be selectable such that, when selected, the automated assistant can pivot from executing the assistant command to initializing execution of the selected alternative assistant command(s). Further, the alternative assistant command(s) that are suggested can be partially fulfilled prior to any user selection thereof. Accordingly, implementations set forth herein can enable the automated assistant to quickly and efficiently pivot between assistant commands that are predicted to be responsive to the user input.

20 Claims, 11 Drawing Sheets

(51) Int. Cl.
 *G06F 3/04842* (2022.01)
 *G06F 3/16* (2006.01)
 *G06F 40/166* (2020.01)
 *G06F 40/20* (2020.01)
 *G06F 40/295* (2020.01)
 *G10L 15/18* (2013.01)
 *G10L 15/22* (2006.01)

(52) U.S. Cl.
 CPC .. *G10L 2015/221* (2013.01); *G10L 2015/223* (2013.01)

(56) References Cited

U.S. PATENT DOCUMENTS

| | | |
|---|---|---|
| 2008/0065382 A1 | 3/2008 | Gerl et al. |
| 2016/0314791 A1 | 10/2016 | Wang et al. |
| 2017/0132019 A1* | 5/2017 | Karashchuk ........ G06F 3/04886 |
| 2018/0143956 A1* | 5/2018 | Skarbovsky .......... G06F 40/166 |
| 2019/0138648 A1* | 5/2019 | Gupta ..................... H04L 51/02 |
| 2019/0354548 A1 | 7/2019 | Orr et al. |
| 2020/0301657 A1* | 9/2020 | Edmonds ................ G10L 15/22 |

OTHER PUBLICATIONS

Reddit.com; "[Feature] When asking Siri to play specific music "Maybe you wanted . . . " will appear with secondary suggestions;" retrieved from internet https://www.reddit.com/r/iOSBeta/comments/i18664/feature_when_asking_siri_to_play_ specific_music/; 4 pages; retrieved on Aug. 24, 2021.

* cited by examiner

PASSIVE DISAMBIGUATION OF ASSISTANT COMMANDS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In many instances, interacting with an automated assistant can create many opportunities for misinterpretation of ambiguous user inputs that include assistant requests and/or commands. For example, assume that a user provides a request for playback of media content (e.g., a song) that is available through multiple different media applications. In this example, the automated assistant may provide output (e.g., audible and/or visual output) that requires the user select a particular application to be utilized for the playback of the media content—instead of the automated assistant automatically selecting a particular application and causing immediate playback of the media content in response to the request. Moreover, and assuming there are multiple media content items that have the same name, the automated assistant may provide additional or alternative output (e.g., audible and/or visual output) that requires the user to select a particular media content item having the same name—instead of the automated assistant selecting a particular media content and causing playback of the particular media content at the particular application in response to the request. As a result, a dialog between the automated assistant and the user is prolonged, thereby wasting computational resources at a client device utilized to implement the dialog between the automated assistant and the user and wasting the user's time.

In some instances, and even assuming the automated assistant does automatically select the particular application to be utilized for the playback of the media content and/or automatically select the particular media content in response to the request, there is often no efficient mechanism for the user to pivot to an alternative application or an alternative media content that may also be responsive to the request. For example, assume the request for playback of the media content is a request for playback of a song titled "Crazy" that is available for playback through multiple different media applications. Further assume there are multiple songs titled "Crazy" by different artists, including at least a first artist and a second artist. In this example, if the user intended to cause playback of "Crazy" by the second artist, but the automated assistant automatically selects "Crazy" by the first artist and automatically causes playback thereof, then the user may be required to provide further user input to cancel the playback of "Crazy" by the first artist and to provide even further user input (often refined to include a name of the second artist) to cause "Crazy" by the second artist to be provided for playback. As a result, a dialog between the automated assistant and the user is prolonged, thereby wasting computational resources at a client device utilized to implement the dialog between the automated assistant and the user.

SUMMARY

Some implementations set forth herein relate to an automated assistant that automatically initializes performance of at least a first operation to fulfill an assistant command that is included in a spoken utterance provided by a user. Further, the automated assistant simultaneously causes selectable element(s) for corresponding alternative operation(s) associated with alternative fulfillment of the assistant command that is included in the spoken utterance to be provided for presentation to the user while the first operation is being performed by the automated assistant. Accordingly, if a user selects the selectable element(s), the automated assistant terminates performance of the first operation, and automatically initializes performance of the corresponding alternative operation(s) associated with the alternative fulfillment of the assistant command that is included in the spoken utterance. In these and other manners described herein, the automated assistant can passively disambiguate the spoken utterance such that the user does not have to subsequently resubmit the spoken utterance or any clarifying spoken utterance when the first operation does not correspond to a particular operation intended by the user. Put another way, the automated assistant can initialize performance of a given operation that is predicted to be responsive to the spoken utterance, and can quickly and efficiently pivot to alternative operations that are also considered responsive to the spoken utterance. As used herein, the automated assistant simultaneously causing the selectable element(s) to be provided for presentation to the user while the first operation is being performed by the automated assistant can include causing the selectable element(s) to be provided for presentation to the user at a same time that the first operation is automatically initialized by the automated assistant and/or within a threshold duration of time before and/or after a time that the first operation is automatically initialized by the automated assistant.

In some versions of these implementations, assistant input data characterizing a plurality of interpretations that are predicted to be responsive to the spoken utterance can be generated based on the spoken utterance. In these implementations, each of the plurality of interpretations can include a corresponding, one or more corresponding parameters associated with the corresponding intent, and one or more corresponding slot values for the one or more corresponding parameters associated with the corresponding intent. Further, metric data that characterizes a predicted degree of correspondence between each of the plurality of interpretations and the assistant command that is included in the spoken utterance can be generated based on the assistant input data. In some implementations, the metric data can include, for example, confidence levels associated with processing the spoken utterance using various components, such as automatic speech recognition (ASR) metrics associated with ASR output(s) generated based on processing the spoken utterance using ASR model(s), natural language understanding (NLU) metrics associated with NLU output(s) generated based on processing the ASR output(s) using NLU model(s), fulfillment metrics associated with fulfillment output(s) generated based on processing the NLU output(s) using fulfillment model(s) and/or rule(s), and/or other metrics associated with processing the spoken utterance. In additional or alternative implementations, the metric data can be based on user profile data of a user that provided the spoken utterances, user profile data of other users that are similar to the user that provided the spoken utterance, an aggregate increase in spoken utterances that include the request across a particular geographical region, and/or other data. In some versions of those implementations, the metric data can be generated using one or more machine learning models and/or heuristic processes that process these various signals to generate the metric data. Based on the assistant input data and the metric data, the automated assistant can cause a first operation associated with a first interpretation, of the plurality of interpretations, to be automatically initialized to fulfill the assistant command that is included in the spoken utterance, and can cause the selectable element(s) associated with other interpretation(s), of the plurality of interpretations, to be provided for presentation to the user.

For example, assume a user provides a spoken utterance of "Play the song 'Crazy'". The automated assistant can process the spoken utterance using various components (e.g., ASR components, NLU components, fulfillment components, and/or other components) to generate the assistant input data that characterizes the plurality of interpretations. In this example, each of the plurality of interpretations may be associated with a music intent based on determining the user intends for a song titled "Crazy" to be played back responsive to the spoken utterance. However, in providing the spoken utterance, the user specified a slot value for a song parameter (e.g., "Crazy") that is associated with the music intent, but did not specify a slot values associated with an artist parameter that is associated with the music intent, a slot value for an application parameter that is associated with the music intent, or slot values for any other parameters that may be associated with the music intent. Nonetheless, in generating the assistant input data that characterizes the plurality of interpretations that are predicted to be responsive to the spoken utterance, the automated assistant can infer various slot values to generate the plurality of interpretations. For instance, a first interpretation can include the music intent, the slot value of "Crazy" for the song parameter, a slot value of "Artist 1" for the artist parameter, and a slot value of "Application 1" for the application parameter; a second interpretation can include the music intent, the slot value of "Crazy" for the song parameter, a slot value of "Artist 2" for the artist parameter, and the slot value of "Application 1" for the application parameter; a third interpretation can include the music intent, the slot value of "Crazy" for the song parameter, the slot value of "Artist 1" for the artist parameter, and a slot value of "Application 2" for the application parameter; and the like.

Although the above example is described with respect to the plurality of interpretations each sharing the same intent (e.g., the music intent), it should be understood that is for the sake of example and is not meant to be limiting. In contrast with the above example, assume the user instead provided a spoken utterance of "Play 'The Floor is Lava'". Similarly, the automated assistant can process the spoken utterance using various components (e.g., ASR components, NLU components, fulfillment components, and/or other components) to generate the assistant input data that characterizes the plurality of interpretations. However, in this example, the plurality of interpretations may be associated with different intents. For instance, a first interpretation can include a music intent, a slot value of "The Floor is Lava" for a song parameter, a slot value of "Artist 1" for an artist parameter, and a slot value of "Application 1" for an application parameter; a second interpretation can include the music intent, the slot value of "The Floor is Lava" for the song parameter, a slot value of "Artist 2" for the artist parameter, and the slot value of "Application 1" for the application parameter; a third interpretation can include a television show intent, the slot value of "The Floor is Lava" for a video parameter, and a slot value of "Application 2" for the application parameter; a fourth interpretation can include a game intent, a slot value of "The Floor is Lava" for a game parameter, and a slot value of "Application 3" for the application parameter; and the like.

Moreover, in these examples, the automated assistant can automatically initialize a given operation associated with a given one of the plurality of interpretations to fulfill the assistant command that is included in the spoken utterance based on the assistant input data and based on metric data generated for each of the plurality of interpretations in processing the spoken utterance (e.g., ASR metric data, NLU metric data, and/or fulfillment metric data). For instance, in the first example, the automated assistant can automatically initialize performance of a first operation associated with the first interpretation that includes the music intent, the slot value of "Crazy" for the song parameter, the slot value of "Artist 1" for the artist parameter, and the slot value of "Application 1" for the application parameter assuming the metric data indicates that the first interpretation is most likely to correspond to the assistant command in the spoken utterance. Nonetheless, in this example, the automated assistant can cause selectable element(s) associated with alternative interpretations to be rendered for presentation to the user while the first operation is automatically initialized and performed (e.g., while "Crazy" by "Artist 1" is played back by "Application 1"). For example, a corresponding selectable element associated with the second interpretation (e.g., the music intent, the slot value of "Crazy" for the song parameter, the slot value of "Artist 2" for the artist parameter, and the slot value of "Application 1" for the application parameter) and a corresponding selectable element associated with the third interpretation (e.g., the music intent, the slot value of "Crazy" for the song parameter, the slot value of "Artist 1" for the artist parameter, and the slot value of "Application 2" for the application parameter) can be rendered for presentation to the user while "Crazy" by "Artist 1" is played back by "Application 1".

Accordingly, in response to a user selection of one of the corresponding selectable elements (e.g., via a touch selection directed to the corresponding selectable element or a voice selection of the corresponding selectable element), the automated assistant can pivot away from performing the first operation to automatically initializing and performing an alternative operation that is associated with the alternative operation to fulfill the assistant command included in the spoken utterance. For example, in response to a user selection of the corresponding selectable element associated with the second interpretation, the automated assistant can terminate performance of the first operation (e.g., play back of "Crazy" by "Artist 1" at "Application 1"), and automatically initialize performance of a second operation associated with the second interpretation (e.g., initialize playback of "Crazy" by "Artist 2" at "Application 1"). As a result, the automated assistant can quickly and efficiently pivot between different interpretations for the spoken utterance without having to generate and render prompt(s) for the user to actively disambiguate these different interpretations for the spoken utterance prior to causing any operations to be initialized. Rather, by enabling passive disambiguation of the assistant command that is included in the spoken utterance as described herein, the automated assistant can prioritize reducing latency in fulfilling the assistant command that is included in the spoken utterance and can prioritize concluding a human-to-computer dialog between the automated assistant and the user in quicker and more efficient manner.

Moreover, although the above examples are described with respect to assistant commands associated with controlling media content, it should be understood that is for the sake of example and is not meant to be limiting. For example, assume the user instead provided a spoken utterance of "Translate the light to 20 percent". Similarly, the automated assistant can process the spoken utterance using various components (e.g., ASR components, NLU components, fulfillment components, and/or other components) to generate the assistant input data that characterizes the plurality of interpretations. In this example, assume the user intended the spoken utterance to cause a brightness of one or more smart lights that are controllable via the automated assistant to be dimmed to 20 percent. However, because users may not typically use this vernacular to adjust a brightness setting of their lights, a first interpretation of the spoken utterance may include a translation intent with a slot value of "the light to 20 percent" as a term or phrase parameter to be translated from a primary language to one or more secondary languages. Nonetheless, a second interpretation of the spoken utterance may include a control lights intent with a slot value of "20 percent" for a brightness parameter, and a slot value of "kitchen" for a light location parameter; a third interpretation of the spoken utterance may include the control lights intent with the slot value of "20 percent" for a brightness parameter, and a slot value of "living room" for a light location parameter; and the like. As a result, the automated assistant can automatically initialize a given operation associated with a given one of the plurality of interpretations to fulfill the assistant command that is included in the spoken utterance (e.g., provide the translation of "the light to 20 percent" from the primary language to one or more of the secondary languages), but also provide selectable element(s) associated with the alternative interpretations of the spoken utterance that, when selected, enable the user to adjust one or more smart lights via a touch selection directed to the selectable element(s) or a voice selection of the selectable element(s).

In various implementations, such as when the user provides a voice selection of selectable element(s) via an additional spoken utterance, processing of the additional spoken utterance can be biased towards content associated with the selectable element(s) that are rendered for presentation to the user. For example, and as described above, assume the user provides a spoken utterance of "Play the song 'Crazy'". Further assume the automated assistant automatically initializes performance of a first operation associated with a first interpretation that includes the music intent, the slot value of "Crazy" for the song parameter, the slot value of "Artist 1" for the artist parameter, and the slot value of "Application 1" for the application parameter. Moreover, further assume that a corresponding selectable element associated with a second interpretation that includes the music intent, the slot value of "Crazy" for the song parameter, the slot value of "Artist 2" for the artist parameter, and the slot value of "Application 1" for the application parameter, and that a corresponding selectable element associated with a third interpretation that includes the music intent, the slot value of "Crazy" for the song parameter, the slot value of "Artist 1" for the artist parameter, and the slot value of "Application 2" for the application parameter are rendered for presentation to the user. In this example, ASR and/or NLU processing of the additional spoken utterance can be biased towards the slot values associated with these alternative interpretations, or ASR output and/or NLU output generated based on processing of the additional spoken utterance can be biased towards the slot values associated with these alternative interpretations.

In various implementations, the selectable element(s) associated with the alternative interpretations can be rendered for presentation to the user for a threshold duration of time subsequent to the automated assistant automatically initializing performance of the assistant command to fulfill the assistant command included in the spoken utterance. In some versions of those implementations, the threshold duration of time can be static. For example, the selectable element(s) associated with the alternative interpretations can be rendered for presentation for 10 seconds, 15 seconds, or any other static threshold duration of time subsequent to the automated assistant automatically initializing performance of the assistant command to fulfill the assistant command included in the spoken utterance. In other versions of those implementations, the threshold duration of time can be dynamic, and can be based on, for example, one or more of the intents for one or more of the plurality of interpretations or a type of operation to be performed based on one or more of the plurality of operations. For example, in implementations where the plurality of operations are associated with media content, the selectable element(s) associated with the alternative interpretations may only be rendered for presentation to the user for 10 seconds. However, in implementations where the plurality of operations are associated with controlling smart devices of a user, the selectable element(s) associated with the alternative interpretations may only be rendered for presentation to the user for 30 seconds.

In various implementations, fulfillment data for the alternative operations associated with the selectable element(s) can be pre-cached at a client device utilized by the user to interact with the automated assistant to reduce latency in performing the alternative operations. Continuing with the above example, where the user provides a spoken utterance of "Play the song 'Crazy'", and the automated assistant automatically initializes performance of the first operation associated with the first interpretation that includes the music intent, the slot value of "Crazy" for the song parameter, the slot value of "Artist 1" for the artist parameter, and the slot value of "Application 1" for the application parameter, the automated assistant can queue up "Crazy" by "Artist 2" at "Application 1" for the second interpretation, and can queue up "Crazy" by "Artist 1" at "Application 2" for the third interpretation. Put another way, the automated assistant can, in the background of the client device, establish connections with various applications, queue up various content for playback at the client device, queue up various content for display at the client device, and/or otherwise pre-cache fulfillment at the client device.

In various implementations, the selectable element(s) that are rendered for presentation to the user can be included in graphical user interface (GUI) data that characterizes an assistant GUI that is responsive to the spoken utterance. The GUI data can include, for example, one or more control elements associated with controlling the first operation that is automatically initialized by the automated assistant, the selectable element(s) associated with the alternative operations, and/or any other data associated with how and/or when to render content for visual presentation to the user. For example, the GUI data can include prominence data that indicates a corresponding area of a display of the client device to be utilized for displaying the selectable element(s) associated with the alternative operations, and a corresponding size for the corresponding area of the display of the client device to be utilized for displaying the selectable element(s) associated with the alternative operations. Continuing with the above example, where the user provides a spoken utterance of "Play the song 'Crazy'", and the automated assistant automatically initializes performance of the first operation associated with the first interpretation that includes the music intent, the slot value of "Crazy" for the song parameter, the slot value of "Artist 1" for the artist parameter, and the slot value of "Application 1" for the application parameter, the GUI data in this example can indicate that the selectable element associated with the second interpretation should be displayed more prominently than the selectable element associated with the third interpretation, such that the selectable element associated with the second interpretation encompasses a larger area of the display of the client device, the selectable element associated with the second interpretation is displayed above the selectable element associated with the third interpretation, and the like. In this example, the GUI data can indicate that the selectable element associated with the second interpretation should be displayed more prominently than the selectable element associated with the third interpretation based on the metric data associated with the second interpretation indicating it is more likely that the second interpretation is responsive to the spoken utterance as compared to the third interpretation. Also, in this example, the GUI data can indicate that only the selectable element associated with the second interpretation should be displayed without displaying the selectable element associated with the third interpretation. The GUI data may indicate that only the selectable element associated with the second interpretation should be displayed without displaying the selectable element associated with the third interpretation based on, for example, the metric data associated with the second interpretation satisfying a metric threshold and the metric data associated with the third interpretation not satisfying the metric threshold, a size of the display of the client device indicating that only one selectable element can be displayed, and/or other criteria.

In various implementations, the user can provide one or more inputs to cause additional selectable element(s) that are associated with additional interpretations and that are not initially provided for presentation to the user to be displayed. For example, the user can swipe in a particular direction (e.g., up-swipe, down-swipe, left-swipe, and/or right-swipe) or provide other touch input (e.g., a long tap, a hard tap) at the display of the client device to cause the additional selectable element(s) to be provided for presentation to the user. As another example, the user can provide an additional spoken utterance that includes one or more particular words or phrases that, when detected, cause the automated assistant to provide the additional selectable element(s) for presentation to the users (e.g., "More", "Show me more", etc.).

In various implementations, in causing the automated assistant to automatically initialize performance of a given operation that is predicted to be responsive to the spoken utterance, the automated assistant can consider one or more costs associated with the given operation. The one or more costs can include, for example, whether the assistant command associated with the given operation utilized pecuniary information of the user, whether the assistant command associated with the given operation causes an electronic communication (e.g., a phone call, a text message, an email message, a social media message, etc.) to be initiated and/or transmitted from the client device of the user to an additional client device of an additional user, whether the assistant command associated with the given operation consumes a threshold quantity of computational resources, whether the assistant command associated with the given operation delays other processes, whether the assistant command associated with the given operation impacts the user or another person in some way if the given operation is inaccurate, and/or other costs. For instance, a cost associated with performing an operation that utilizes pecuniary information or that causes the client device to initiate and/or transmit an electronic communication may be considered much greater than a cost associated with causing media content to be provided for playback to the user.

By using techniques described herein, various technical advantages can be achieved. As one non-limiting example, techniques described herein enable an automated assistant to passively disambiguate assistant commands that are included in spoken utterances provided by users. For example, the user can provide a spoken utterance that includes a request, and the automated assistant can automatically initialize performance of an assistant command that is predicted to be responsive to the request based on a first interpretation of the request while simultaneously providing selectable element(s) that are also predicted to be responsive to the request and that are associated with other interpretations of the request. Accordingly, if the user provides a user selection of one of the selectable element(s), the automated assistant can quickly and efficiently pivot automatically initializing performance of an assistant command that is associated with the other interpretations. Notably, the automated assistant need not generate and render prompt(s) prior to initializing performance of the assistant command. As a result, latency in fulfilling the request can be reduced, computational resources at the client device can be conserved, and a duration of the human-to-computer dialog can be reduced. Moreover, fulfillment data associated with these other interpretations can be pre-cached at the client device such that, if the user does provide a user selection of one of the selectable element(s), then latency in switching performance to one of these alternative assistant commands can be reduced.

The above description is provided as an overview of some implementations of the present disclosure. Further description of those implementations, and other implementations, are described in more detail below.

DETAILED DESCRIPTION

Figure 1A:
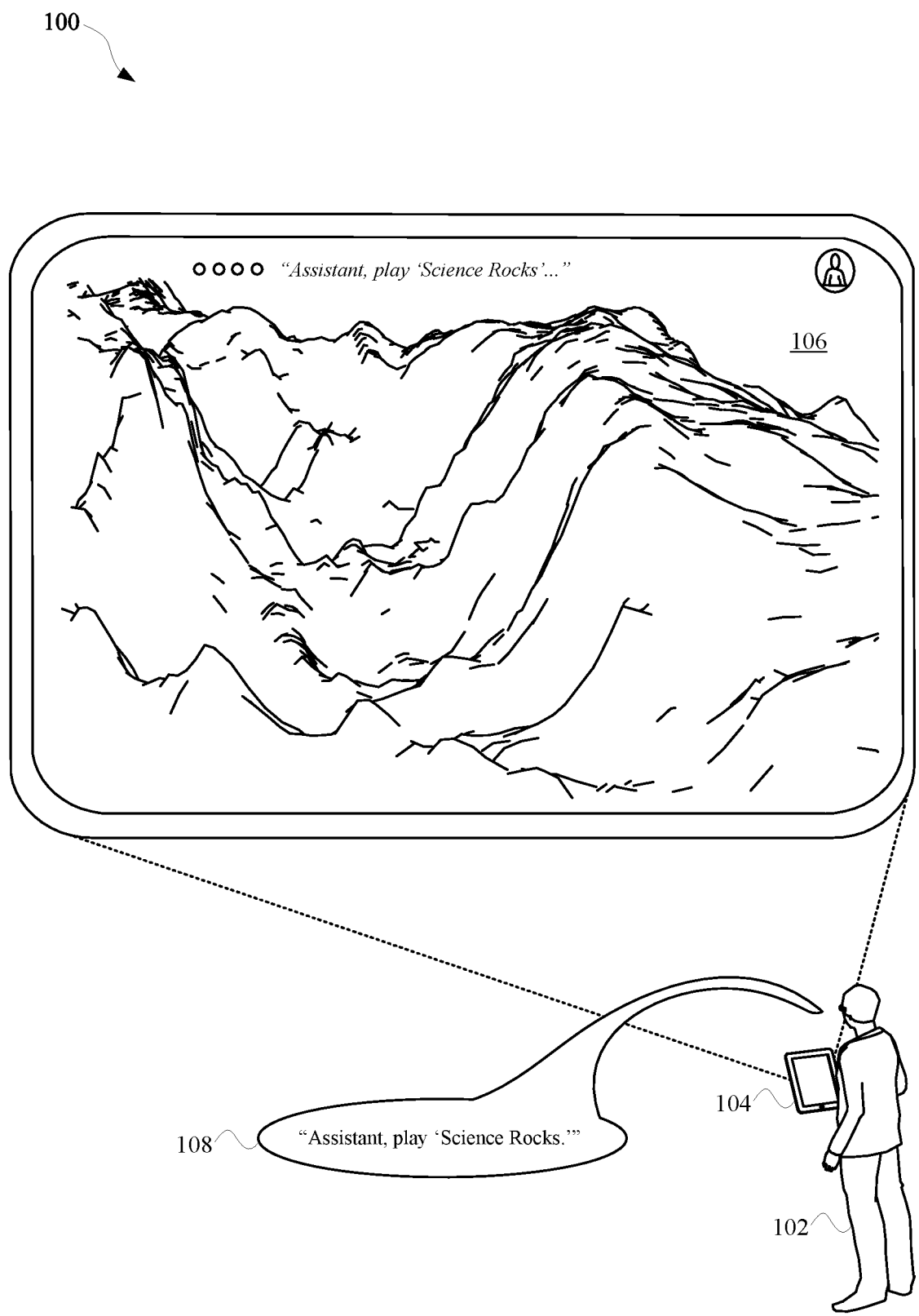
FIG. 1A, FIG. 1B, FIG. 1C, and FIG. 1D illustrate views of a user invoking an automated assistant, which can suggest alternative interpretations in response to a user input, simultaneous to execution of a particular interpretation that is predicted to be most relevant to the user input.

FIG. 1A, FIG. 1B, FIG. 1C, and FIG. 1D illustrate a view 100, a view 120, a view 140, and a view 160, respectively, of a user 102 invoking an automated assistant that can suggest alternative interpretations in response to a user input, simultaneous to execution of a particular interpretation that is predicted to be most relevant to the user input. The suggested alternative interpretations can be suggested via a display interface 106 and/or other interface of a computing device 104 for the user 102 to select—should the user 102 decide that the executing interpretation is not what the user intended. For example, and illustrated in FIG. 1A, a user 102 can provide a spoken utterance 108 to the automated assistant such as, "Assistant, 'Play Science Rocks,'" which can refer to a song that the user 102 would like to hear via an audio interface of a computing device 104. In response to receiving the spoken utterance 108, the automated assistant can initialize execution of an assistant command associated with the particular interpretation of the spoken utterance that is predicted to have a greatest degree of correspondence to the spoken utterance 108 provided by the user 102.

Figure 1B:
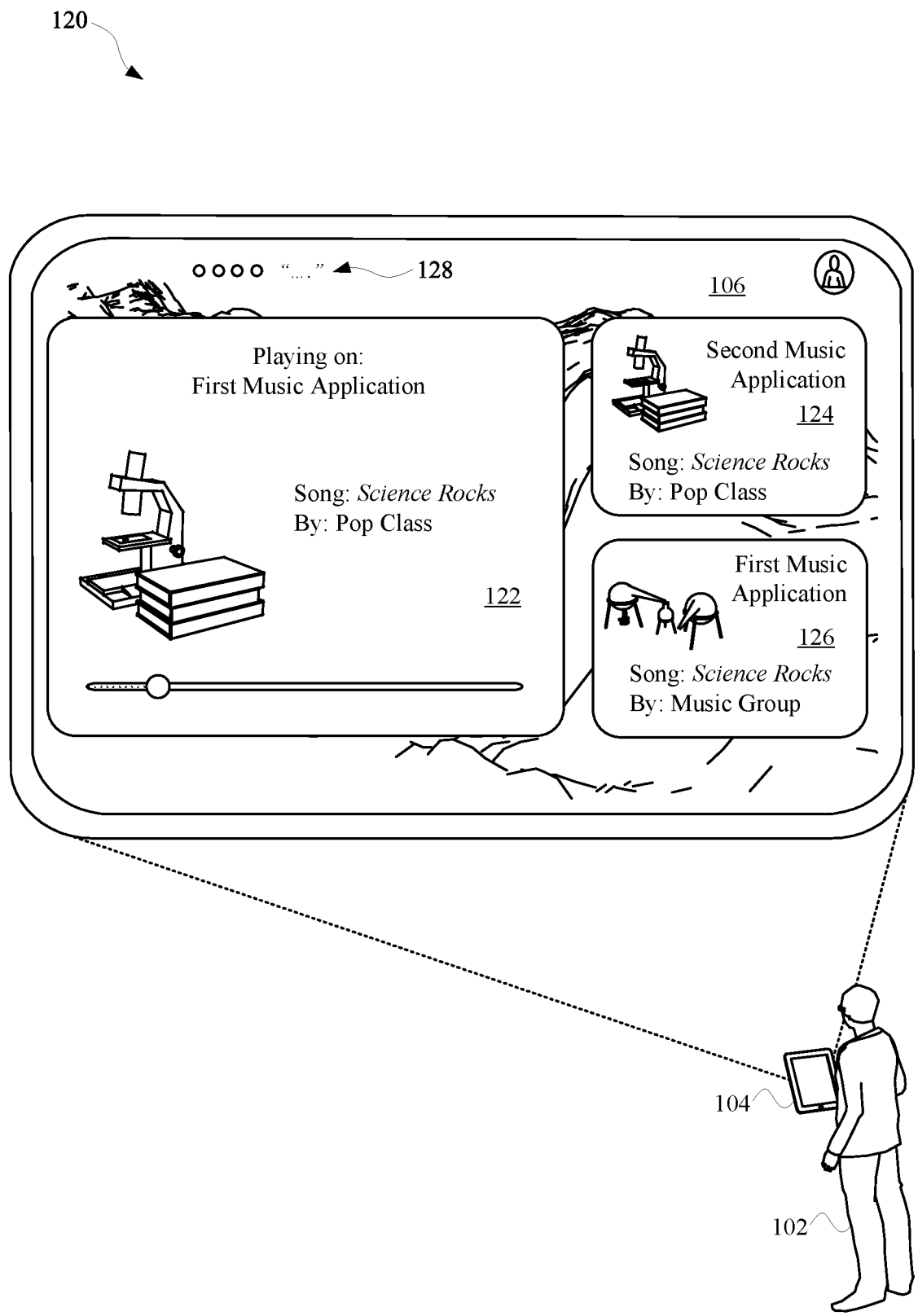

As illustrated in FIG. 1B, and in response to the spoken utterance 108, the automated assistant can cause the computing device 104 to render a graphical element 122 at a display interface 106 of the computing device 104. The graphical element 122 can operate as an interface for controlling one or more operations corresponding to the executing intent. For instance, in response to receiving the spoken utterance 108, a graphical element 122 can be rendered at the display interface 106, and can indicate that the song "Science Rocks" is being played via a first music application accessible to the computing device 104. In some implementations, because the user 102 did not specify a particular music application for the song to be rendered or a particular artist of the song "Science Rocks", the automated assistant can infer one or more different slot values for corresponding parameters associated with the music intent, such as one or more different music applications that the user may be intending to cause the automated assistant to interact with and infer one or more different artists that the user may be intending to cause the automated assistant to utilize for playback of the song "Science Rocks". For example, the automated assistant may select slot values for corresponding parameters that are predicted to have the greatest degree of correspondence to the spoken utterance 108, and the automated assistant can automatically initialize playback of the song "Science Rocks" with those slot values, such as a slot value of first music application for the application parameter and a slot value of Pop Class for the artists parameter as shown by the graphical element 122 of FIG. 1B.

In some implementations, and in addition to the execution of this initial interpretation, the automated assistant can generate one or more other alternative interpretations that can be suggested to the user 102 via one or more selectable elements, such a first suggestion element 124 and a second suggestion element 126. In some implementations, additional suggested interpretations can be provided to the user 102 when the initial interpretation does not have a predicted degree of correspondence (i.e., a correspondence metric) to the user request and/or spoken utterance 108 that satisfies a threshold degree of correspondence (i.e., a metric threshold). For example, a first suggestion element 124 can suggest that the requested song be played using a different music application (e.g., a second music application for the application parameters), and the second suggestion element 126 can suggest that the initially predicted music application play a song having the same name (e.g., "Science Rocks"), but by a different artist (e.g., "Music Group" as shown in FIG. 1B). Further, the first suggestion element 124 and the second suggestion element 126 can be rendered simultaneous to the automated assistant executing the assistant command associated with the initial interpretation. This can allow the automated assistant to execute the initial interpretation with the greatest degree of correspondence to the requested command, while also providing suggestions—in case the automated assistant was incorrect about the initial interpretation. Notably, the first suggestion element 124 and the second suggestion element 126 may only be provided for presentation to the user for a threshold duration of time.

Figure 3:
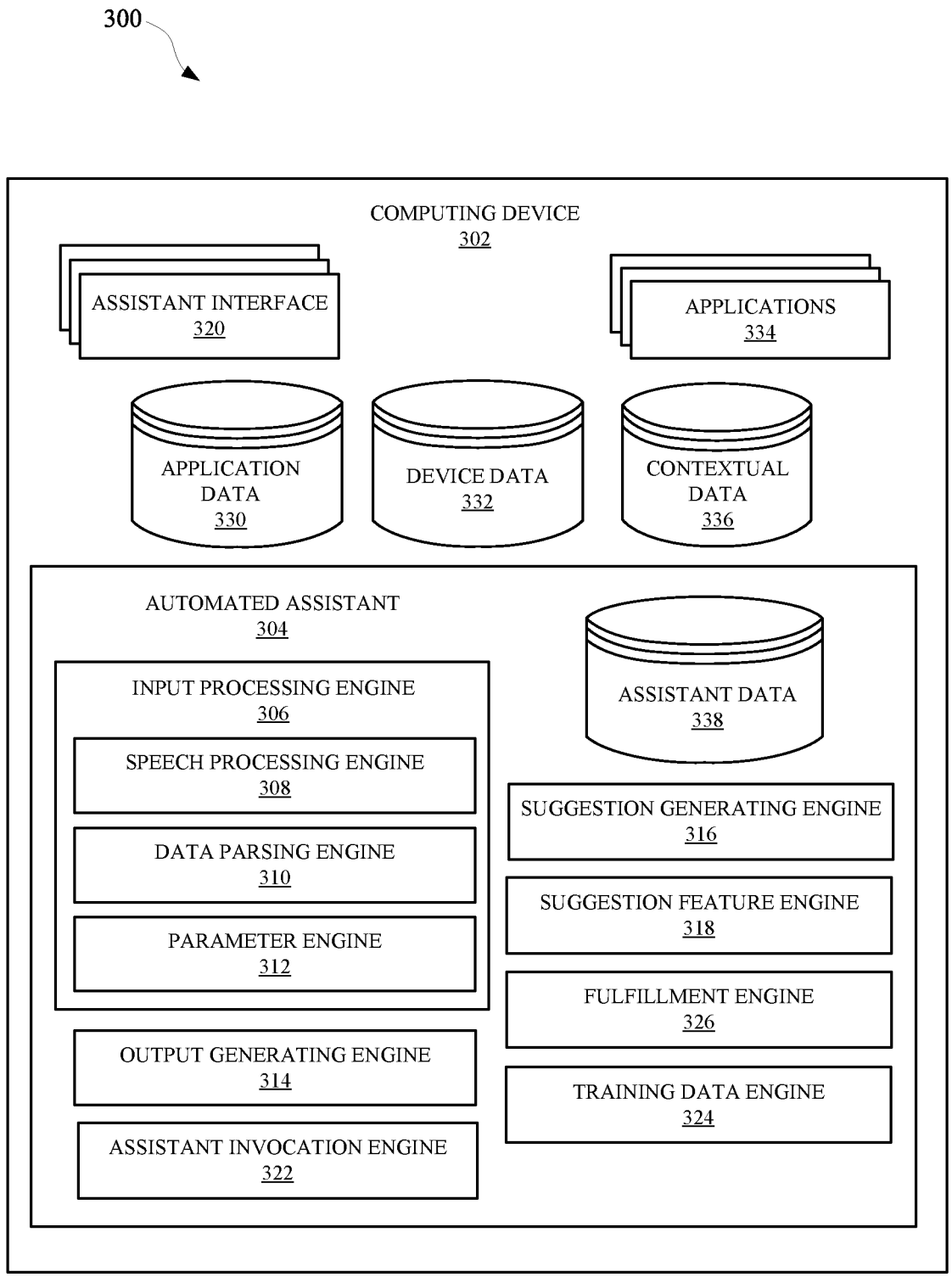
FIG. 3 illustrates a system that can invoke an automated assistant for suggesting alternative user interpretations in response to a user input, simultaneous to execution of a particular interpretation that is predicted to be most relevant to the user input.

In various implementations, and as described in more detail with respect to FIG. 3, the interpretations can be generated based on processing the spoken utterance 108 using various components available to the automated assistant at the computing device 104. For example, an automatic speech recognition (ASR) component can be utilized to process audio data that captures the spoken utterance 108 to generate ASR output. The ASR output can include, for example, speech hypotheses that are predicted to correspond to the spoken utterance 108, ASR metrics associated with the speech hypotheses, phonemes that are predicted to correspond to the spoken utterance 108, and/or other ASR output. Further, a natural language understanding (NLU) component can be utilized to process the ASR output to generate NLU output. The NLU output can include, for example, one or more intents that are predicted to satisfy the spoken utterance 108 (e.g., a music intent in the example of FIGS. 1A-1D), corresponding parameters associated with each of the one or more intents, corresponding slot values for the corresponding parameters, NLU metrics associated with the one or more intents, the corresponding parameters, and/or the corresponding slot values, and/or other NLU output. Moreover, a fulfillment component can be utilized to process the NLU output to generate fulfillment data. The fulfillment data can correspond to various operations that, when executed, cause the automated assistant to perform corresponding assistant commands in an attempt to fulfill the spoken utterance, and can optionally be associated with fulfillment metrics that are indicative of how likely that execution of a given assistant command is predicted to satisfy the spoken utterance. Notably, each of the interpretations described herein can include various combinations of intents, corresponding parameters, and corresponding slot values, and the automated assistant can generate assistant input data that characterizes these various combinations of intents, corresponding parameters, and corresponding slot values.

In some implementations, the automated assistant can automatically initialize performance of the operation associated with the initial interpretation based on the correspondence metrics for each of the plurality of interpretations. In some versions of these implementations, the correspondence metrics can be generated based on the ASR metrics, the NLU metrics, and the fulfillment metrics associated with each of the plurality of interpretations. In additional or alternative implementations, the correspondence metrics can be generated based on user profile data of the user that provided the spoken utterance 108 (e.g., user preferences, user interaction history with various applications accessible at the computing device 104, user search history, user purchase history, user calendar information, and/or any other information about the user of the computing device 104), user profile data of other users that are similar to the user that provided the spoken utterance 108, an aggregate increase in spoken utterances that include the request across a particular geographical region, and/or other data.

In some versions of those implementations, the metric data can be generated using one or more machine learning models and/or heuristic processes that process these various signals to generate the metric data. For example, one or more machine learning models can be trained to process these signals to determine, for each of the plurality of interpretations, the correspondence metrics that are indicative of a predicted degree of correspondence between each of the plurality of interpretations and the spoken utterance 108. In some of these implementations, the one or more machine learning models can be trained on-device based on data generated locally at the computing device 104 such that the one or more machine learning models are personalized to the user 102 of the computing device 104. The one or more machine learning models can be trained based on a plurality of training instances, where each of the training instances can include training instance input and training instance output. The training instance input can include any combination of these signals and/or example interpretations of spoken utterances, and the training instance output can include ground truth output that indicates a ground truth interpretation for the training instance input. The training instance input for a given training instance can be applied as input across the one or more machine learning models to generate predicted output that includes the correspondence metric for each of the example interpretations, and the predicted output can be compared to the ground truth output to generate one or more losses. Further, the one or more losses can be utilized to update the one or more machine learning models (e.g., via backpropagation). The one or more machine learning models can be deployed after sufficient training (e.g., based on processing a threshold quantity of training instances, based on training for a threshold duration of time, based on performance of the one or more machine learning models during training, etc.). As another example, one or more heuristic-based processes or rules can be utilized to process these signals and/or the plurality of interpretations to determine, for each of the plurality of interpretations, the correspondence metrics that are indicative of a predicted degree of correspondence between each of the plurality of interpretations and the spoken utterance 108. Based on the assistant input data and the metric data, the automated assistant can cause a first operation associated with a first interpretation, of the plurality of interpretations, to be automatically initialized to fulfill the assistant command that is included in the spoken utterance, and can cause the selectable element(s) associated with other interpretation(s), of the plurality of interpretations, to be provided for presentation to the user.

For example, the initial interpretation may be selected, from among a plurality of interpretations as being most likely to satisfy the spoken utterance based on the initial interpretation having a greatest predicted degree of correspondence to satisfy the spoken utterance, and can be automatically initialized by the automated assistant in response to the spoken utterance. For example, and as indicated in FIG. 1B, the automated assistant can cause the first music application to render an audio output corresponding to the song "Science Rocks" by the artist "Pop Class" using the first music application. Nonetheless, one or more other interpretations having the next greatest degree of correspondence to the spoken utterance can be a basis for the first selectable element 124 (e.g., the song "Science Rocks" by the artist "Pop Class", but using the second music application instead of the first music application) and the second selectable element 126 (e.g., the song "Science Rocks" using the first music application, but by the artist "Music Class" instead of "Pop Class"). In this way, and in some implementations, the user 102 can select one or more selectable suggestion elements simultaneous to, or after the execution of, an operation associated with the initial interpretation that is predicted to have the highest degree of correspondences to the spoken utterance.

Figure 1C:
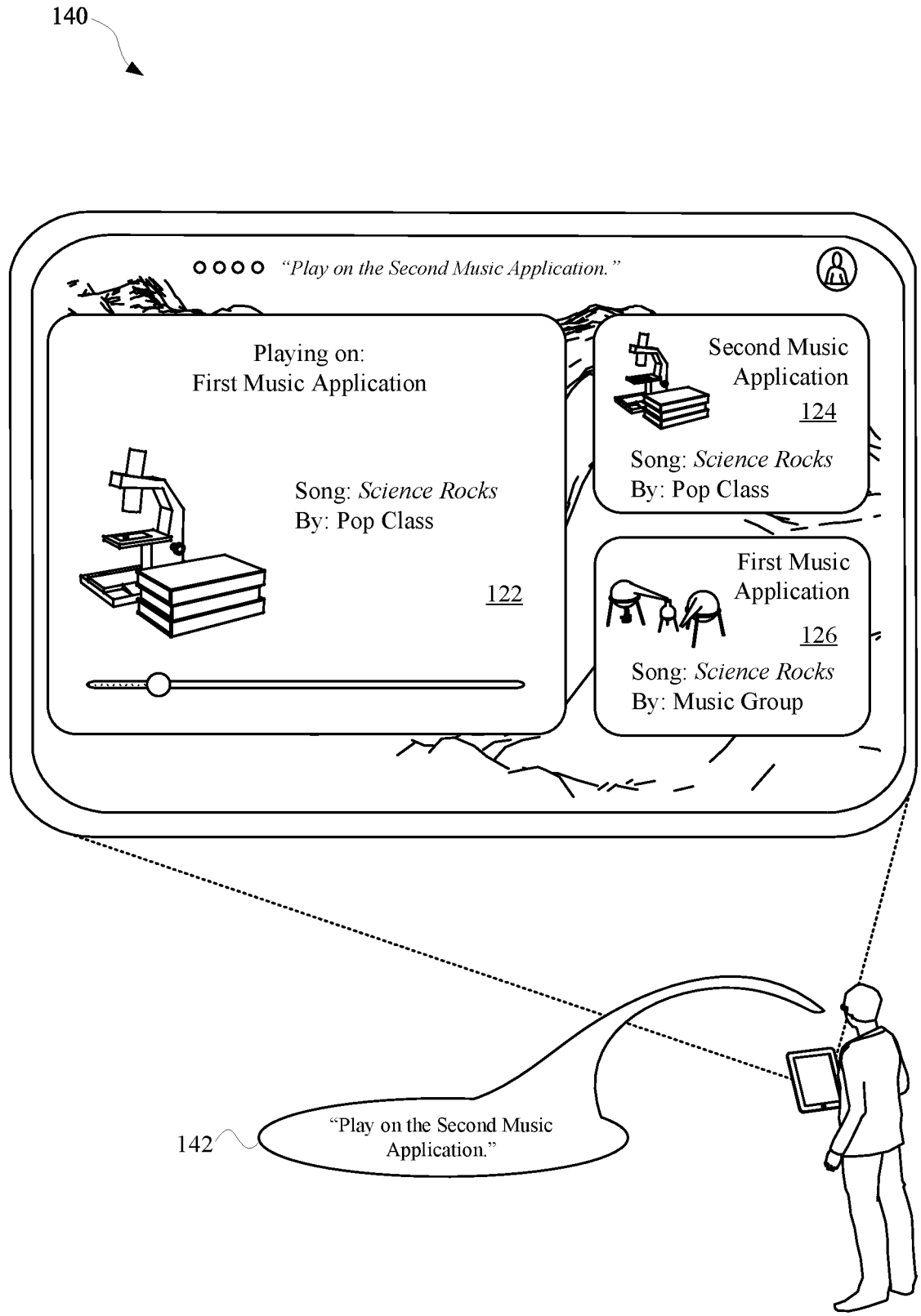
Figure 1D:
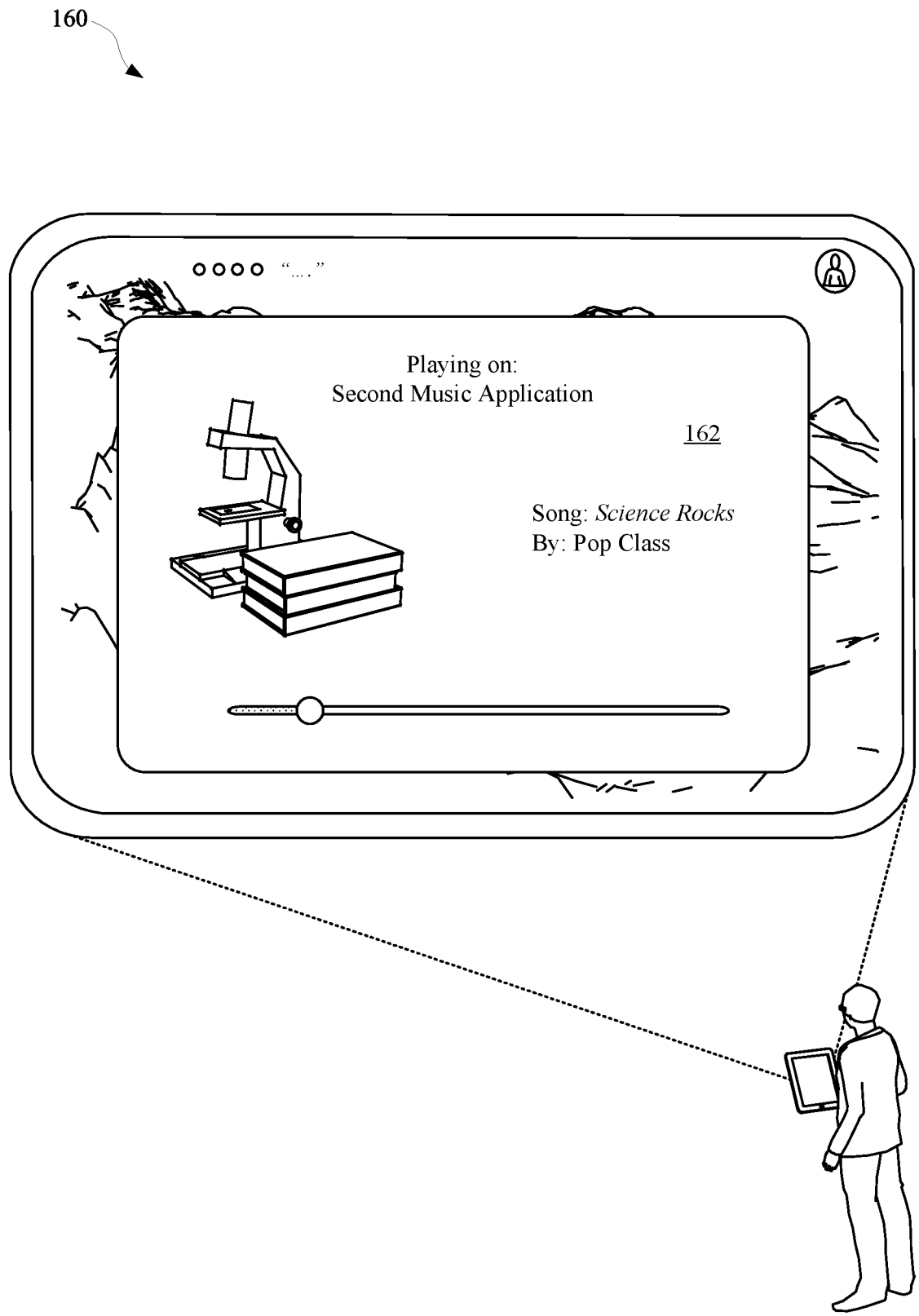

In some implementations, a selectable suggestion can be selected using an assistant input, such as another spoken utterance and/or other input gesture to the computing device and/or any other device associated with the automated assistant. For example, and as illustrated in FIG. 1C, the user 102 can provide another spoken utterance 142 such as, "Play on the second music application." In some implementations, the automated assistant can provide an indication 128 that an audio interface of the computing device 104 remains initialized for receiving inputs directed to one or more of the selectable suggestions (e.g., shown in FIG. 1B). As illustrated in FIG. 1C and FIG. 1D, in response to receiving the other spoken utterance 142, the automated assistant can determine that the user 102 is providing a request for the automated assistant to stop execution of the operation associated with the initial interpretation that was automatically initialized, and can initialize execution of an alternative operation associated with an alternative interpretation corresponding to the first selectable element 124. In response to receiving the other spoken utterance 142, the automated assistant can automatically initialize performance of the alternative operation associated with the alternative interpretation corresponding to the first selectable element 124. Alternatively, and in some implementations, the automated assistant can cause graphical element 162 to be rendered at the graphical user interface 106 of the computing device 104 to indicate that the alternative operation associated with the alternative interpretation has been executed.

In some implementations, the automated assistant can cause the automated assistant and/or other application to bias one or more ASR and/or NLU components toward content that is associated with the first selectable element 124 and the second selectable element 126, such as terms or phrases for one or more slot values corresponding to the one or more of the selectable elements. For example, in the example of FIG. 1C, the automated assistant can bias one or more processing of the spoken utterance 142 toward terms such as "second application" and/or "Music Group." In this way, as the automated assistant keeps an audio interface initialized (as indicated by graphical element 128), the user 202 can elect to provide another spoken utterance such as, "second application." In response, processing of the audio data that captures the spoken utterance 142 can be biased toward any terms associated with the first selectable element 124 and the second selectable element 126.

In some implementations, prominence and/or an area of each selectable suggestion and/or graphical element relative to other selectable suggestions and/or graphical elements can be based on predicted degrees of correspondence of their respective interpretations for the request from the user 102. For example, and as shown in FIG. 1B, a first area of the display interface 106 that is associated with the first selectable element 124 and a second area of the display interface 106 that is associated with the second selectable element 126 can have the same area at the display interface 106 when their respective degrees of correspondence to the spoken utterance 108 are the same. However, the first area of the display interface 106 that is associated with the first selectable element 124 can be larger than the second area of the display interface 106 that is associated with the second selectable element 126 when the predicted degree of correspondence associated with the alternative interpretation of the first selectable element 124 is larger than the alternative interpretation of the second selectable element 126. In some implementations, selectable suggestions corresponding to some or all of the alternative interpretations may be omitted from the display interface 106 of the computing device 104 based on the metrics.

Figure 2A:
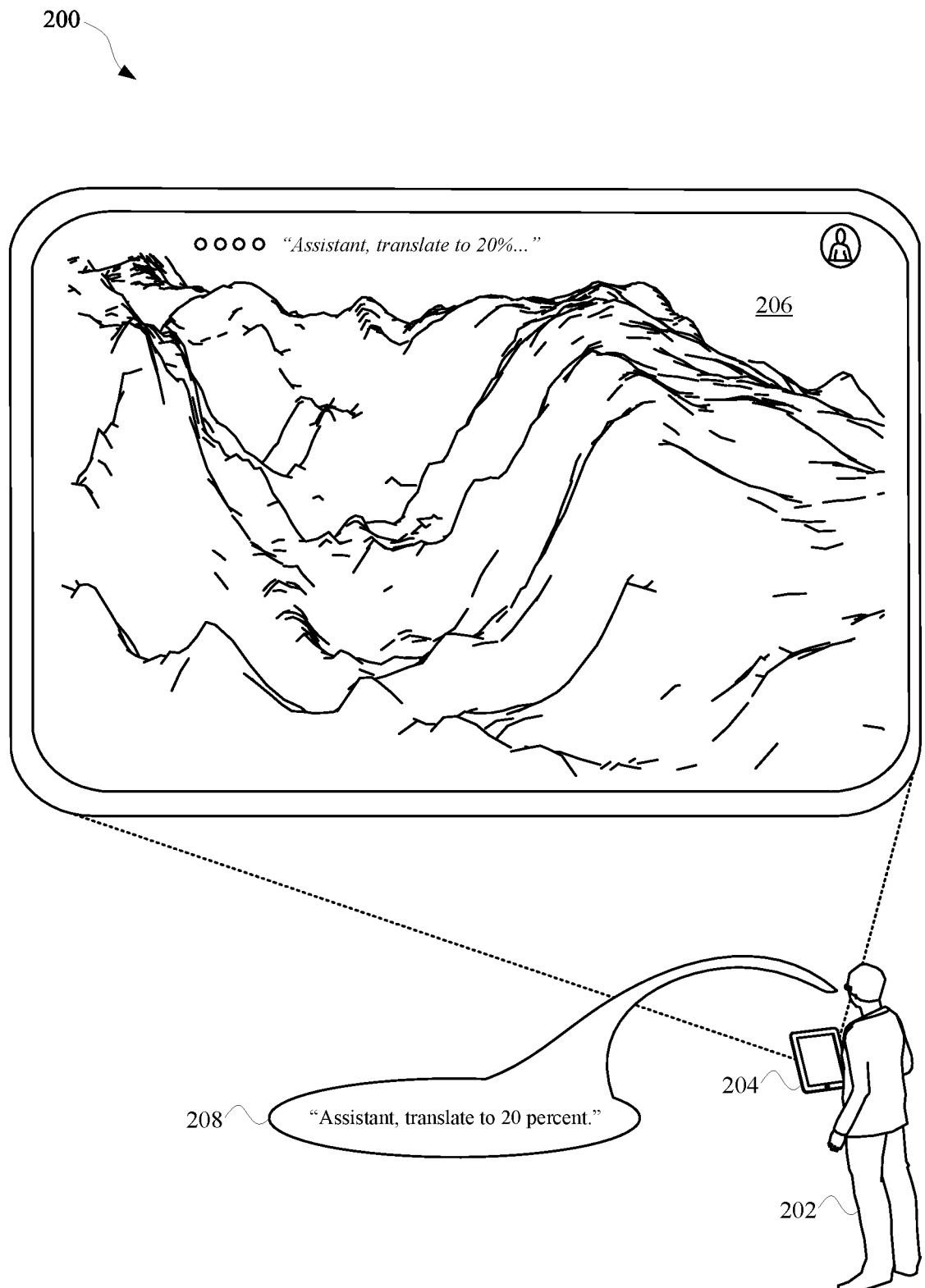
FIG. 2A, FIG. 2B, and FIG. 2C illustrate views of a user invoking an automated assistant that, in response to a user input, can provide selectable suggestions at a display interface of a computing device simultaneous to initializing execution of a particular interpretation.
Figure 2B:
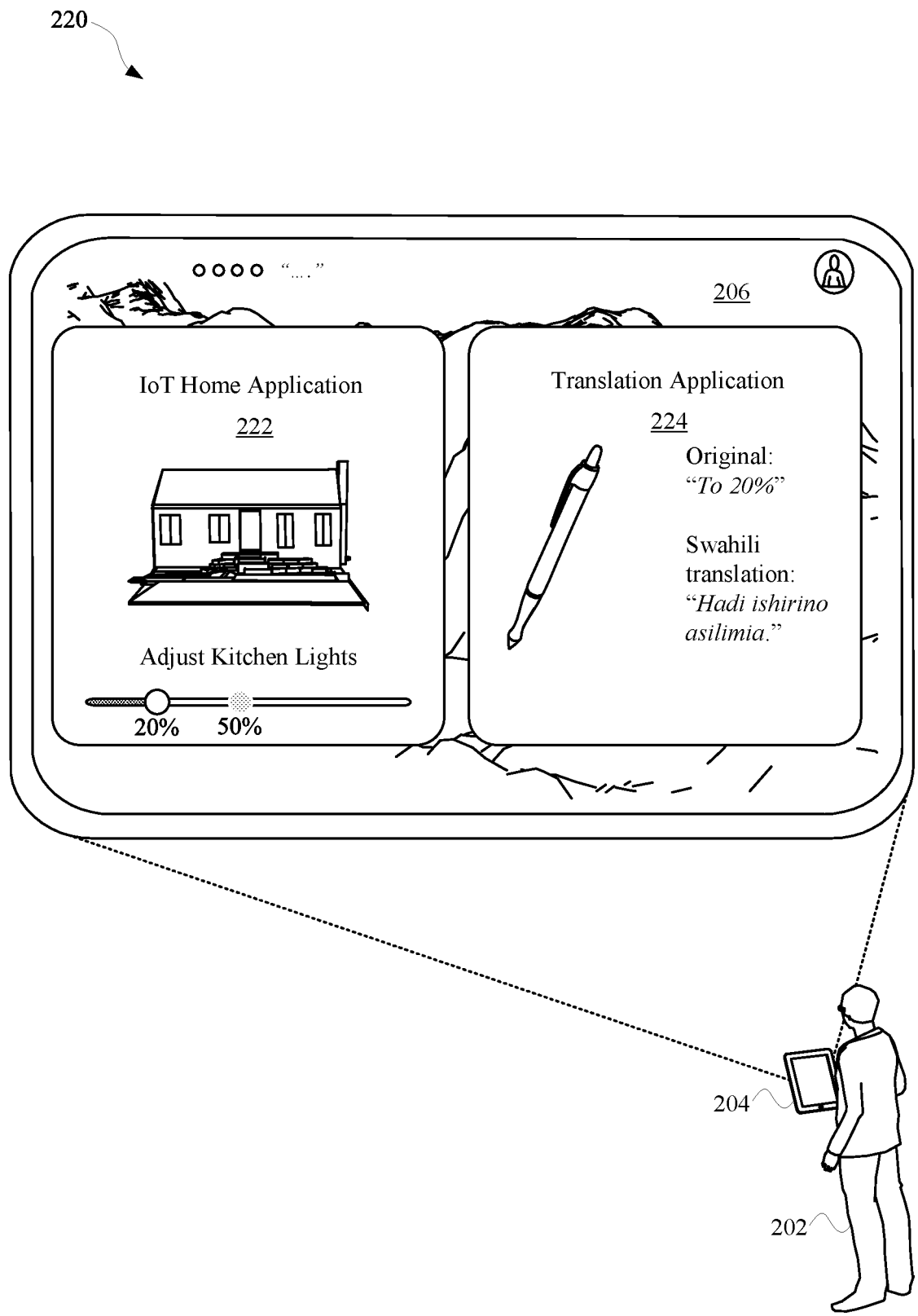
Figure 2C:
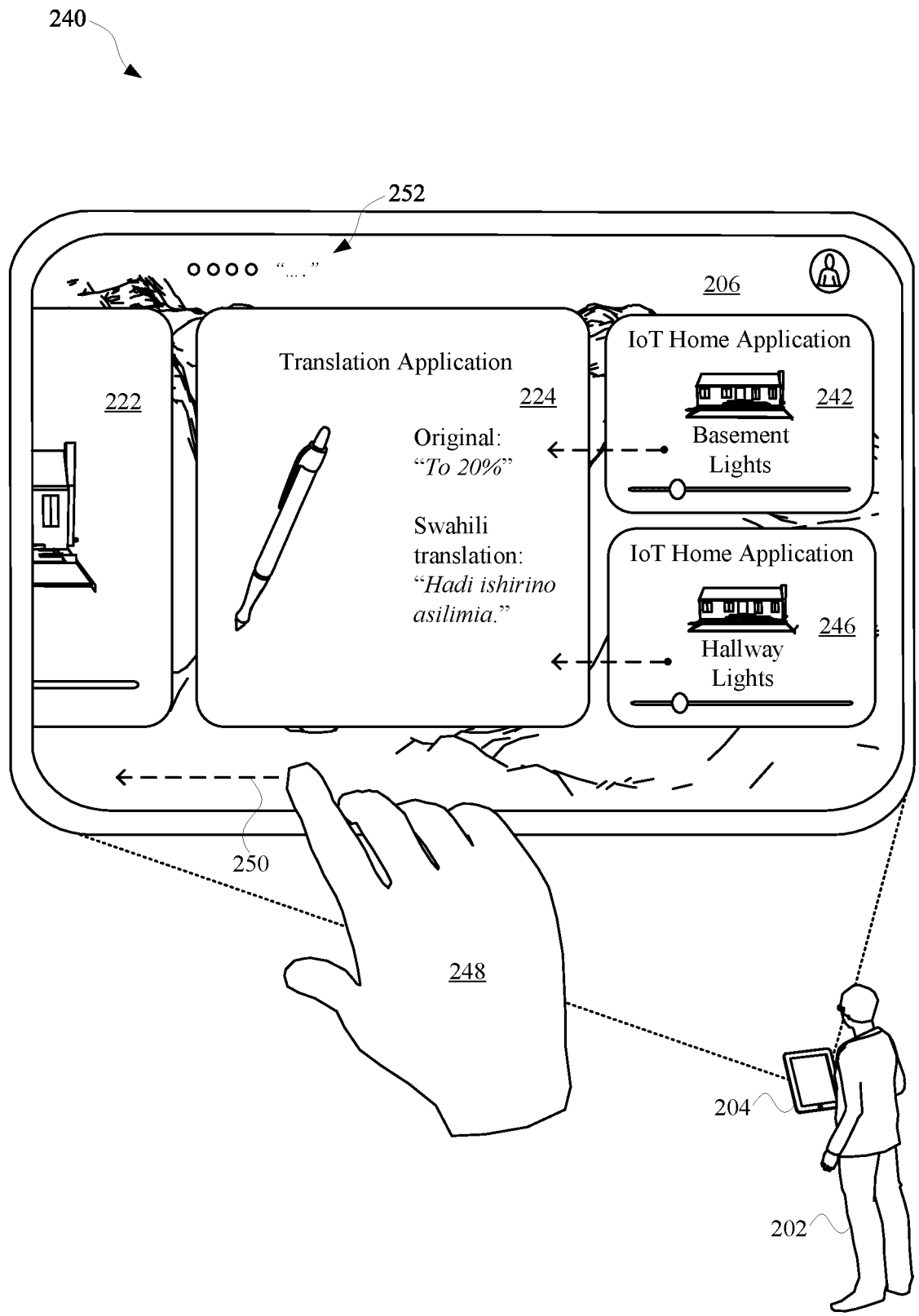

FIG. 2A, FIG. 2B, and FIG. 2C illustrate a view 200, a view 220, and a view 240, respectively, of a user 202 invoking an automated assistant that, in response to a user input, can provide selectable suggestions at a display interface 206 of a computing device 204 simultaneous to initializing execution of a particular interpretation of the user input. The selectable suggestions can be generated based on natural language content of the user input having multiple different interpretations. For example, and as illustrated in FIG. 2A, the user 202 can provide a spoken utterance 208 such as, "Assistant, translate to 20 percent." For the sake of example throughout FIGS. 2A-2C, assume the user 202 user provided the spoken utterance 208 in order to cause a brightness level of one or more lights in the home of the user 202 to be adjusted to 20%. However, because the spoken utterance 208 can have multiple different interpretations, the automated assistant can process the spoken utterance 208 to determine whether other suggestions should be rendered for presentation to the user 202.

For example, in response to receiving the spoken utterance 208, the automated assistant can cause a first selectable element 222 and a second selectable element 224 to be rendered at the display interface 206 of the computing device 204 as shown in FIG. 2B. The first selectable element 222 can correspond to a first interpretation that is predicted, by the automated assistant or other application, to be most likely to satisfy the request embodied in the spoken utterance 208. The second selectable element 224 can correspond to a second interpretation that is predicted to have less of a chance of satisfying the request than the first interpretation associated with the first selectable element 222. In some implementations, the automated assistant can cause an assistant command associated with the first interpretation to be executed in response to the spoken utterance while simultaneously rendering the second selectable element 224 that allows the user 202 to initialize execution of an alternative assistant command associated with the second interpretation.

Alternatively, or additionally, the automated assistant can cause the assistant command associated with the first interpretation and the assistant command associated with the first interpretation to be automatically executed in response to receiving the spoken utterance 208. Automatic execution of the assistant command and/or the alternative assistant command can be performed when one or more "costs" of executing the assistant command and/or the alternative assistant command satisfies a threshold value. For example, a value for an amount of processing and/or time that is predicted to be consumed for executing a suggested user intent can be estimated. When the value satisfies a particular threshold value, the automated assistant can cause the assistant command and/or the alternative assistant command to be executed in response to the spoken utterance 208. For example, and as illustrated in FIG. 2B, the automated assistant can cause the assistant command associated with the first selectable element 222 to be automatically executed, thereby causing an IoT Home Application to adjust brightness of lights of a home of the user (e.g., the "Kitchen Lights") from 50% to 20%. Furthermore, the automated assistant can also cause a translation application to translate a portion of the spoken utterance 208 (e.g., "To 20%"). In this instance, because both the assistant command and the alternative assistant command can be executed without much processing and/or consuming much time, both the assistant command and the alternative assistant command can be executed. However, if one of the assistant commands would take more than a threshold amount of processing and/or time, or would otherwise negatively impact the user or an additional user, then neither the assistant command and/or the alternative assistant command may be executed.

In some implementations, although the automated assistant may cause particular selectable elements to be rendered at the display interface 206 of the computing device 204 in response to the spoken utterance 208, the user 202 may desire to have additional alternative interpretations to choose from. For example, and as illustrated in FIG. 2C, the user 202 can provide an input gesture 250 to the computing device 204 in order to cause a third selectable element 242 and a fourth selectable element 246 to be rendered at the display interface 206. A prominence of each selectable element can depend on a predicted relevance of each respective element to a user input. For example, an area of the third selectable element 242 and an area of the fourth selectable element 246 can each be smaller than each respective area of the first selectable element 222 and the second selectable element 224. This can be in part based on a predicted degree of correspondence of a third interpretation (controllable via the third selectable element 242) and a fourth interpretation (controllable via the fourth selectable element 246) of the spoken utterance 208. In other words, a display area of the third selectable element 242 and the fourth selectable element 246 can be less than the first selectable element 222 because the first interpretation associated with the first selectable element 222 and the second interpretation associated with the second selectable element 224 are predicted to have a higher probability of satisfying the request embodied in the spoken utterance 208 than the third interpretation and the fourth interpretation.

In some implementations, the input gesture 250 can cause the automated assistant to select one or more other slot values for the first interpretation and/or the second interpretation. These selected slot values can be the basis of the third selectable element 242 and the fourth selectable element 246. For example, the first interpretation can include a particular slot value that identifies "Kitchen Lights" for a light location parameter of the first interpretation, and the third interpretation can include another slot value that identifies "Basement Lights" for a light location parameter of the third interpretation. Further, the fourth interpretation can include a different slot value that identifies "Hallway Lights" for a light location parameter of the fourth interpretation.

FIG. 3 illustrates a system 300 that can invoke an automated assistant 304 for suggesting alternative interpretations in response to a user input, simultaneous to execution of a particular interpretation that is predicted to be most relevant to the user input. The automated assistant 304 can operate as part of an assistant application that is provided at one or more computing devices, such as a computing device 302 (e.g., the computing device 104 of FIGS. 1A-1D, the computing device 204 of FIGS. 1A-1C, and/or other computing devices such as a server device). A user can interact with the automated assistant 304 via assistant interface(s) 320, which can be a microphone, a camera, a touch screen display, a user interface, and/or any other apparatus capable of providing an interface between a user and the automated assistant. For instance, a user can initialize the automated assistant 304 by providing a verbal, textual, and/or a graphical input to assistant interface(s) 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be interacting with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera or other vision component(s), but can optionally include one or more other sensors.

The computing device 302 and/or other third-party client devices can optionally be in communication with a server device over a network, such as the Internet, to implement the system 300. Additionally, the computing device 302 and any other computing devices can be in communication with each other over a local area network (LAN), such as a Wi-Fi network. In some implementations, the computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some additional or alternative implementations, the automated assistant 304 can be hosted locally at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data capturing spoken utterance(s) received at an assistant interface 320 to identify the text embodied in the spoken utterance(s). The audio data can be transmitted from, for example, the computing device 302 to the server device in order to preserve computational resources at the computing device 302, and the server device can transmit the text embodied in the spoken utterance(s) back to the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases (e.g., using ASR model(s)). The text converted from the audio data can be parsed by a data parsing engine 310 and made available to the automated assistant 304 as textual data that can be used to generate and/or identify command phrase(s), intent(s), action(s), slot value(s), and/or any other content specified by the user (e.g., using NLU model(s)). In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304 (e.g., using fulfillment model(s) and/or rule(s)). For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334. The output to the user can include, for example, visual output that can be visually rendered for presentation to the user via a display interface of the computing device 302 or a display of an additional computing device that is in communication with the computing device 302, audible output that can be audibly rendered for presentation to the user via speaker(s) of the computing device 302 or speaker(s) of an additional computing device that is in communication with the computing device 302, smart device control commands that control one or more networked smart devices that are in communication with the computing device 304, and/or other output.

The automated assistant application includes, and/or has access to, on-device ASR, on-device NLU, and on-device fulfillment. For example, on-device ASR can be performed using an on-device ASR module that processes audio data (detected by the microphone(s)) using ASR model(s) stored locally at the computing device 302. The on-device ASR module generates ASR output based on processing the audio data, such as one or more speech hypotheses corresponding to recognized text for a spoken utterance (if any) present in the audio data in an end-to-end manner, or predicted phonemes, that are predicted to correspond to the spoken utterance, and the speech hypotheses corresponding to the recognized text can be generated based on the predicted phonemes. Also, for example, an on-device NLU module can process the speech hypotheses corresponding to the recognized text generated by the ASR module using NLU model(s) to generate NLU data. The NLU data can include predicted intent(s) that correspond to the spoken utterance and optionally slot value(s) for parameter(s) that are associated with the intent(s). Also, for example, an on-device fulfillment module can process the NLU data using fulfillment model(s) and/or rule(s), and optionally other local data, to determine assistant command(s) to perform to fulfill the predicted intent(s) of the spoken utterance. These assistant command(s) can include, for example, obtaining local and/or remote response(s) (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to satisfy the spoken utterance.

In various implementations, remote ASR, remote NLU, and/or remote fulfillment can at least selectively be utilized. For example, speech hypotheses corresponding to recognized text can at least selectively be transmitted to remote automated assistant component(s) for remote NLU and/or remote fulfillment. For instance, the speech hypotheses corresponding to the recognized text can optionally be transmitted for remote performance in parallel with on-device performance, or responsive to failure of on-device NLU and/or on-device fulfillment. However, on-device ASR, on-device NLU, on-device fulfillment, and/or on-device execution can be prioritized at least due to the latency reductions they provide when satisfying a spoken utterance (due to no client-server roundtrip(s) being needed to satisfy the spoken utterance). Further, on-device functionality can be the only functionality that is available in situations with no or limited network connectivity.

In some implementations, the computing device 302 can include one or more applications 334 which can be provided by a first-party entity that is the same as an entity that provided the computing device 302 and/or the automated assistant 304 and/or by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302 (e.g., one or more networked smart devices that are in communication with the computing device 302). Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302 and/or executing remotely from the computing device 302 (e.g., one or more streaming applications). Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304 (and determine whether or not the user spoke the invocation phrase to invoke the automated assistant 304), or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes audio data that includes at least an invocation phrase and/or contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment without the user having to provide any invocation phrase.

In some implementations, the system 300 can include a suggestion generating engine 316 that can assist with processing an input from a user in order to determine whether to execute a particular interpretation of a spoken utterance and/or provide one or more suggestions for alternative interpretations of the spoken utterance. In response to receiving an assistant input, the suggestion generating engine 316 can identify multiple different interpretations that have some degree of correspondence to a request embodied in the assistant input, such as different combinations of predicted intent(s) and/or slot value(s) for parameter(s) associated with the predicted intent(s). A degree of correspondence for a particular interpretation can be characterized by a metric, which can have a value that can be compared to one or more different thresholds. For example, a particular interpretation of the spoken utterance can be identified in response to a user input, and a metric for the particular interpretation can be determined to satisfy a target threshold. Based on this determination, the automated assistant 304 can automatically initialize performance of an operation that is associated with the particular interpretation, and can omit rendering suggestion elements corresponding to other interpretations associated with lower-valued metrics.

In some implementations, when a particular interpretation has a highest metric value for a particular user input, but the metric value does not satisfy the target threshold, the automated assistant 304 can determine to render one or more additional suggestion elements. For example, the automated assistant can still automatically initialize performance of an operation that is associated with the particular interpretation, but can also render selectable element(s) corresponding to the other alternative interpretations with the highest metric value(s). These selectable element(s) can be rendered at a display interface of the computing device 302 without any additional user input requesting the selectable element(s). In some implementations, a prominence of one or more of these selectable element(s) can be based on each respective metric value associated with the alternative interpretation for each of the selectable element(s). In some implementations, a metric value associated with each selectable suggestion element can be compared to a suggestion threshold in order to determine whether to render a corresponding one of the selectable element(s). For example, in some implementations, an alternative interpretation associated with a metric value that does not satisfy the suggestion threshold can still be rendered in response to a subsequent input from the user (e.g., a swipe gesture for revealing additional suggestions).

In some implementations, the system 300 can include a suggestion feature engine 318 that can generate assistant GUI data for rendering one or more GUI elements in response to receiving an input from a user. The assistant GUI data can characterize a size of a particular selectable element(s) based on corresponding metric values associated with the particular selectable element(s), an arrangement of particular selectable element(s) on a display (e.g., horizontal and/or vertical displacement of the particular selectable element(s) being characterized by corresponding arrangement data for the particular selectable element(s)) based on the corresponding metric values associated with the particular selectable element(s), display data of particular selectable element(s) on a display that characterizes corresponding display characteristics of the particular selectable element(s) (e.g., bolding characteristics of the particular selectable element(s), fill characteristics of the particular selectable element(s) with respect to a background, and/or any other display characteristics associated with visually rendering the particular selectable element(s)), a quantity of particular selectable element(s) to be displayed based on a size of a display interface of the computing device 302 and/or based on a quantity of alternative interpretative interpretations having corresponding metric values that satisfy a suggestion threshold, and/or other GUI data. Notably, the GUI data can also characterize control element(s) for an operation that is associated with an initial interpretation predicted to satisfy a spoken utterance. The control element(s) can be based on a type of the operation and can include, for example, media control elements when the operation includes playback of media content, a slider element for adjusting a parameters of an IoT device(s) when the operation includes controlling the IoT device(s) (e.g., a temperature of a thermostat, a brightness of smart lights, etc.), and/or other control elements that are based on the type of operation.

In some implementations, the system 300 can include a fulfillment engine 326 that can determine whether to initialize execution and/or partial fulfillment of one or more user intents identified by the automated assistant 304 in response to a user input. For example, the fulfillment engine 326 can cause an operation associated with a particular interpretation of a spoken utterance to be executed in response to a user input when a metric associated with the particular interpretation satisfies the target threshold. Alternatively, or additionally, when no identified interpretation of the spoken utterance satisfies the target threshold, a particular interpretation associated with a highest metric value (e.g., a greatest degree of correspondence to a user input) can be executed by the fulfillment engine 326. In some implementations, one or more alternative interpretations with next-highest metric value(s) (e.g., next greatest degree(s) of correspondence to a user input) can be at least partially fulfilled and/or executed by the fulfillment engine 326. For example, data can be retrieved by the automated assistant 304 and/or another application in furtherance of at least partially fulfilling the alternative interpretations with the next-highest metric value.

In some implementations, the system 300 can include a training data engine 324 that can generate training instances for initially training one or more machine learning models described herein (e.g., utilized in generating the correspondence metrics as described with respect to FIG. 1), and generate training instances for updating the one or more machine learning models based on how a user interacts with the automated assistant 304. The initial training of the one or more machine learning model based on a plurality of training instances is described above with respect to FIG. 1, and the plurality of training instances can be generated using the training data engine 324. Further, a selection or non-selection of any selectable element(s) associated with the alternative interpretations provided for presentation to the user as described herein can be utilized to generate additional training instances for updating the one or more machine learning models. For example, assume the user does not select any of the selectable element(s) associated with the alternative interpretations. In this example, the signals and/or interpretations associated with the spoken utterance can be utilized as training instance input, and ground truth output indicative of the initially selected interpretation can be utilized to positively reinforce the selection of the initial interpretation. In contrast, assume the user selects one of the selectable element(s) associated with the alternative interpretations. In this example, the signals and/or interpretations associated with the spoken utterance can be utilized as training instance input, and ground truth output indicative of the alternative interpretation can be utilized to positively reinforce the selection of the alternative interpretation (and simultaneously negatively reinforce the selection of the initial interpretation). Accordingly, the one or more machine learning models can be updated over time such that the automated assistant 304 can improve selections of initial interpretations. For instance, if an initial interpretation that is selected is associated with a first application for media playback, but the user generally selects an alternative interpretation that is associated with a second application for media playback, then the one or more machine learning models can be updated over time to reflect that the user prefers the second application for media playback.

Figure 4A:
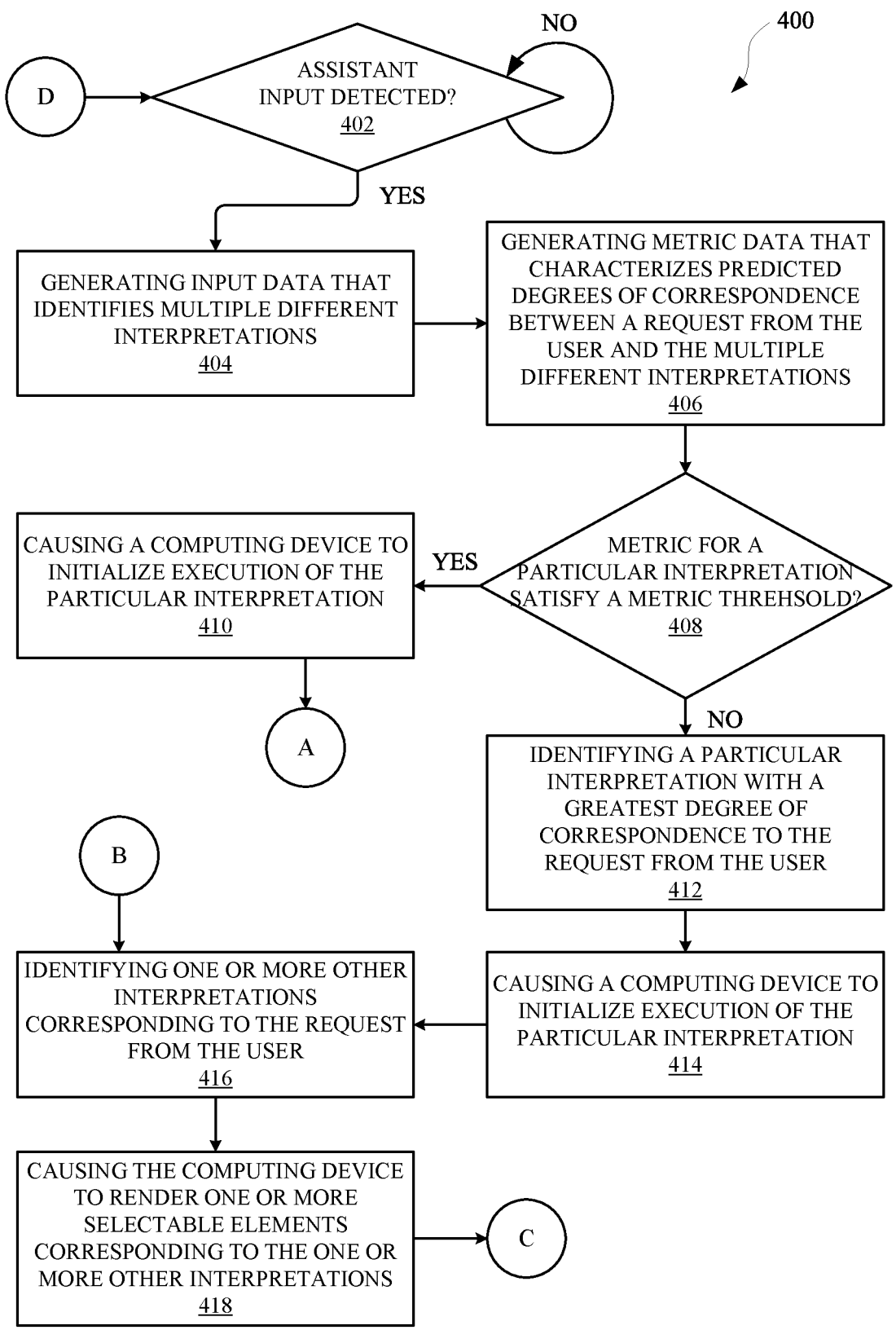
FIG. 4A and FIG. 4B illustrate methods for operating an automated assistant to provide alternative interpretations in response to a spoken utterance that may be interpreted in a variety of different ways and/or may be missing certain parameters.
Figure 4B:
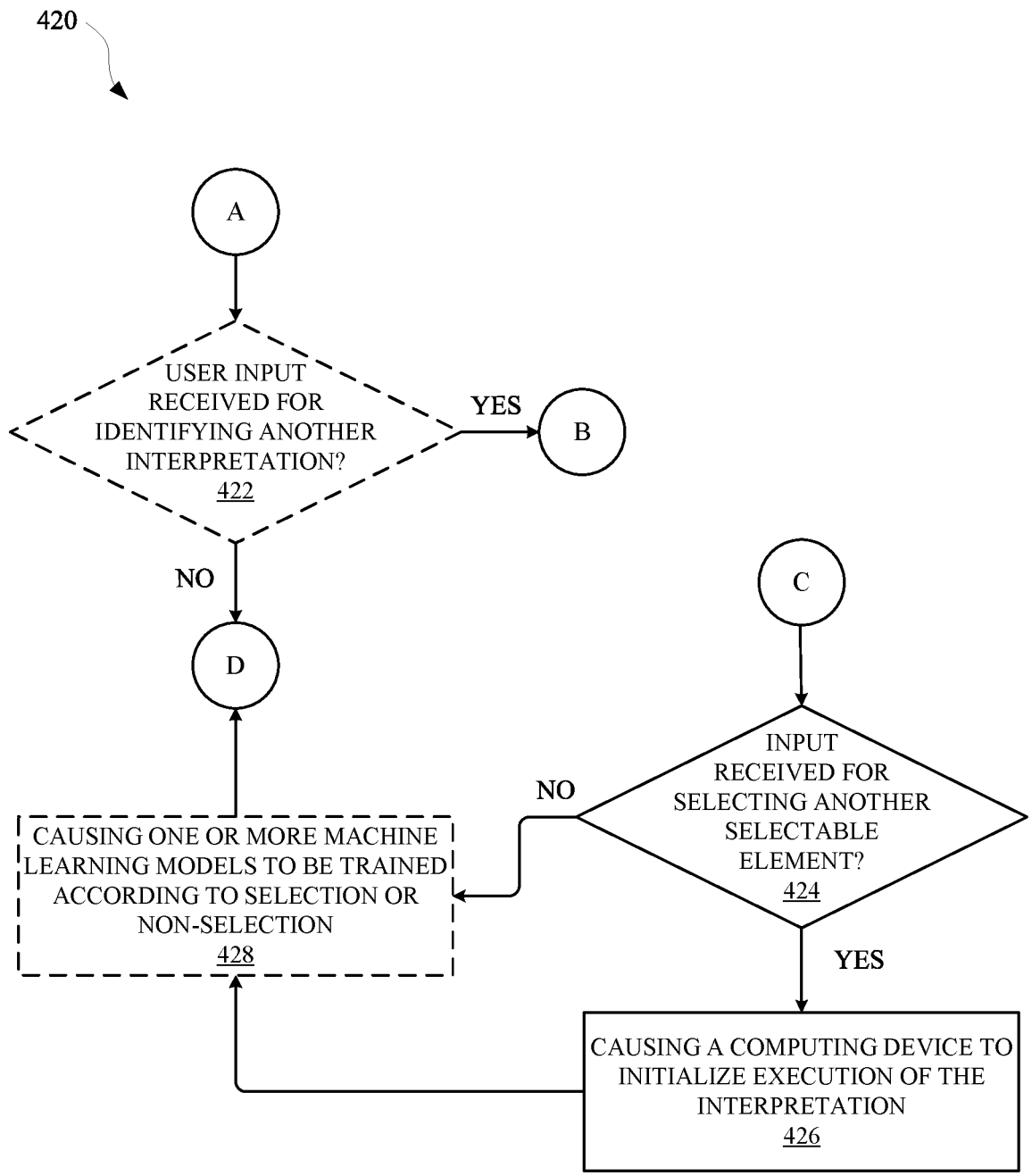

FIG. 4A and FIG. 4B illustrate a method 400 and a method 420 for operating an automated assistant to provide alternative interpretations in response to a spoken utterance that may be interpreted in a variety of different ways and/or may be missing certain parameters. The method 400 and the method 420 can be performed using one or more applications, computing devices, and/or any other apparatus or module capable of interacting with an automated assistant.

The method 400 can include an operation 402 of determining whether an assistant input has been detected by a computing device. The assistant input can be a spoken utterance that includes a request from the user for the automated assistant to perform an assistant command. In response to receiving the spoken utterance, the automated assistant can perform one or more operations (e.g., ASR operations, NLU operations, fulfillment operations, and/or other operations) to generate a plurality of interpretations of the spoken utterance. For example, the spoken utterance can be, "Assistant, play Congolese." Although the user may intend for the spoken utterance to direct the automated assistant to play Congolese music, the automated assistant can automatically initialize a particular operation associated with a first interpretation in response to receiving the spoken utterance, and also identify other operations to suggest to the user that are based on alternative interpretations.

The method 400 can proceed from the operation 402 to an operation 404 when an assistant input is detected. Otherwise, the automated assistant can continue to detect user inputs at the operation 402. The operation 404 can include generating input data that can identify different interpretations. For example, in response to the aforementioned spoken utterance, the automated system can generate assistant input data characterizing different interpretations of the spoken utterance, such as: playing Congolese music via a first application (e.g., playMusic ("Congolese", first application)), translating speech into a language spoken in the Congo (e.g., translateSpeech ("play", English, Swahili)), and/or playing Congolese music via a second application (e.g., playMusic ("Congolese", second application)).

The method 400 can proceed from the operation 404 to an operation 406, which can include generating metric data that characterizes predicted degrees of correspondence between a request from the user that is included in the spoken utterance and the multiple different interpretations of the spoken utterance. In other words, for each interpretation, a metric can be generated for characterizing a degree of correspondence between a respective interpretation and the spoken utterance. For example, and in furtherance of the aforementioned example, an interpretation for playing music on a first application can have a greatest degree of correspondence to the user request compared to other interpretations. An interpretation for playing music on the second application can have the next greatest degree of correspondence, and another interpretation for translating speech can have a particular degree of correspondence that is less than those of the two other interpretations for playing music.

The method 400 can proceed from the operation 406 to an operation 408 which can include determining whether a metric for a particular interpretation satisfies a metric threshold. The metric threshold can be a threshold with which the automated assistant determines that a corresponding interpretation is predicted to satisfy the spoken utterance to such a degree (e.g., 75%, 60%, or any other value) that no additional suggested interpretations may be warranted by the automated assistant. Therefore, when a metric corresponding to a particular interpretation satisfies the metric threshold, the automated assistant can initialize execution of the operation that is associated with the interpretation without rendering other suggested interpretations. However, when no metric for any identified interpretation satisfies the metric threshold, the automated assistant may initialize performance of an operation associated with the interpretation corresponding to a metric that is closest to satisfying the metric threshold, and also simultaneously suggest other interpretations to the user.

When the metric for a particular interpretation satisfies a metric threshold, the method 400 can proceed from the operation 408 to an operation 410. Otherwise, when a metric for any particular interpretation does not satisfy the metric threshold, the method 400 can proceed from the operation 408 to an operation 412 that is described below. The operation 410 can include causing a computing device to initialize execution of the particular interpretation corresponding to the metric that satisfies the metric threshold. For example, when the metric corresponding to the interpretation of playing music via the first application satisfies the metric threshold, the automated assistant can cause the computing device to initialize performance of an operation associated with that particular interpretation. In such instances, although the automated assistant may be objectively confident that the execution of the operation associated with the particular interpretation satisfies the request from the user, the automated assistant can optionally provide operations associated with alternative interpretations to the user.

For instance, the method 400 can proceed via continuation element "A" from the operation 410 to an operation 422 provided in the method 420 of FIG. 4B. The operation 422 can include determining whether an input has been received and is directed to identifying another interpretation. For example, the user may perform a swipe gesture at a display interface of a computing device in order to cause the automated assistant to provide additional suggestions for other operations associated with other interpretations that may be executed responsive to the spoken utterance. These other interpretations can be, for example, identified at the operation 404 but did not have corresponding metrics that satisfied the metric threshold. For example, as the computing device is playing back music via the first application, the user can provide an input gesture or other assistant input to the computing device (e.g., swiping a display interface of the computing device) in order to reveal one or more selectable elements. Each selectable element of the one or more selectable elements can correspond to an operation associated with an alternative interpretation of the spoken utterance. For instance, when the user swipes the display interface while the first application is playing music, a first selectable element can be rendered corresponding to the operation of playing music at the second application as indicated by an alternative interpretation.

When user input is determined to be received at the operation 422, the method 420 can proceed from the operation 422, via continuation element "B," to an operation 416 that is described below. When, at the operation 408 no metrics for any interpretations satisfy the metric threshold, the method 400 can proceed from the operation 408 to an operation 412. The operation 412 can include identifying a particular interpretation with a greatest degree of correspondence to the request from the user that is included in the spoken utterance. For example, although the metric corresponding to the interpretation for playing music at the first application may not satisfy the metric threshold, the metric may nonetheless have the greatest degree of correspondence to the request from the user that is included in the spoken utterance. In other words, performance of the interpretation may be predicted to have a greatest chance of satisfying the request, at least compared to other interpretations that were identified based on the spoken utterance.

The method 400 can proceed from the operation 412 to an operation 414, which can include causing the computing device to automatically initialize execution of the operation associated with the particular interpretation. In accordance with the aforementioned example, this operation associated with the particular interpretation may cause Congolese music to play via the first application. Therefore, the computing device can render Congolese music via the first application and an audio interface of the computing device. The method 400 can proceed from the operation 414 to an operation 416, which can include identifying one or more other interpretations that may satisfy the request included in the spoken utterance. For example, the operation 416 can include identifying alternative interpretations associated with the user data generated at the operation 404.

Alternatively, or additionally, the automated assistant can identify one or more other alternative interpretations that may not have been identified by the input data generated at the operation 404. For example, based on the operation associated with the particular interpretation that is executed at the operation 414 and/or contextual data associated with the request from user that is included in the spoken utterance, the automated assistant can identify other content and/or operations associated with other interpretations to suggest to the user. For example, the automated assistant can identify operations having interpretations that may be similar to the user intent currently executing but may include other parameters, or other slot values for the parameters or the other parameters. For instance, when the operation associated with the particular interpretation of playing music is executing, the other operations associated with the alternative interpretations that are suggested can include slot values that are based on similarities to speech characteristics (e.g., detected phonemes) of the spoken utterance during ongoing processing. For instance, the automated assistant may determine that the word "Portuguese" has some degree of correspondence and/or similarity to the spoken word "Congolese," as spoken by the user via the spoken utterance. Based on this determination, the automated assistant can generate suggestion data that characterizes a selectable suggestion for playing Portuguese music via the first application as an alternative interpretation.

The method 400 can proceed from the operation 416 to an operation 418, which can include causing the computing device to render one or more selectable elements corresponding to the one or other interpretations. The one or more selectable elements can be rendered concurrently with a particular selectable element corresponding to the particular interpretation being executed by the automated assistant. For example, an audio control interface can be rendered for controlling audio playback of content via the first application simultaneous to the one or more selectable elements identified at the operation 416.

The method 400 can proceed from the operation 418, via continuation element "C," to an operation 424, as illustrated in method 420 of FIG. 4B. The operation 424 can include determining whether a user selection was received for selecting another selectable element. When a user input is determined to have been received for selecting another selectable element of the one or more selectable elements, the method 420 can proceed to an operation 426. The operation 426 can include causing a computing device to initialize performance of an alternative operation associated with a particular alternative interpretation corresponding to the selectable element that was selected. Alternatively, or additionally, in response to selection of the selectable element, the automated assistant can cause the alternative operation to be executed and the ongoing execution of the initially selected operation associated with the particular interpretation (e.g., playing Congolese music via the first application) to be canceled and/or paused.

In some implementations, the method 420 can optionally proceed from the operation 426 to an optional operation 428. Alternatively, when no input is received from selecting another selectable element, the method 420 can proceed from the operation 424 to the optional operation 428. The operation 428 can include causing one or more machine learning models to be trained (or updated) according to selection or non-selection of one or more selectable elements. For example, when another selectable element corresponds to another interpretation that is different from a user intent being executed, a trained machine learning model can be trained (or updated) such that the subsequent interpretations will, thereafter, be biased towards the selected interpretation in response to receiving a subsequent instance of the request. As a result, the alternative interpretation (e.g., playing Congolese music at the second application) may be initialized in response to receiving the subsequent instance of the request.

Figure 5:
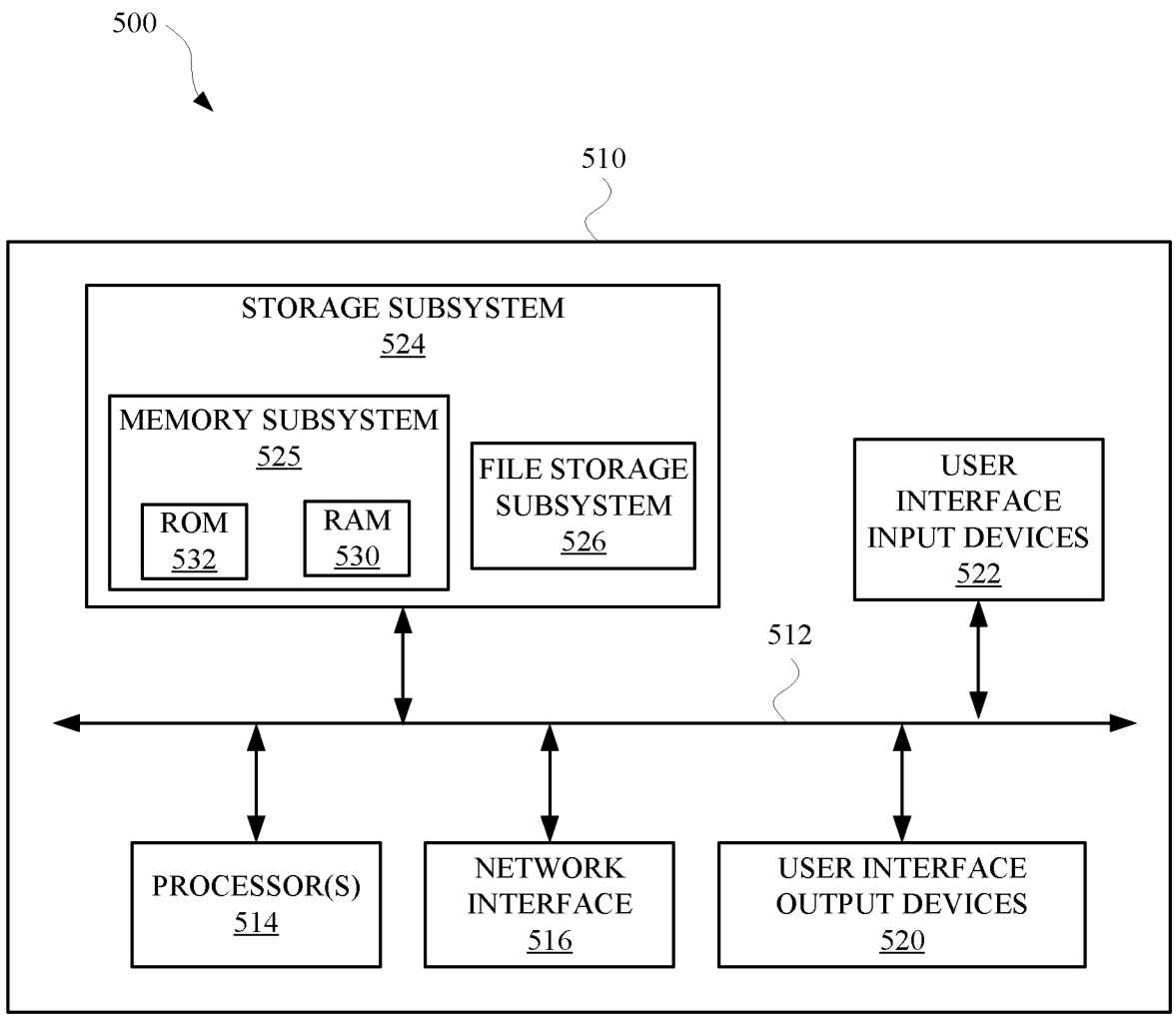
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400 and method 420, and/or to implement one or more of system 300, computing device 104, computing device 204, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, client device (e.g., the computing device 104 of FIGS. 1A-1D, the computing device 302 of FIG. 3, and/or other client devices), or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, and includes receiving, at a computing device, a spoken utterance of a user that is directed to an automated assistant, the spoken utterance including an assistant command to be fulfilled by the automated assistant; generating, based on the spoken utterance, assistant input data that characterizes a plurality of interpretations that are predicted to be responsive to the spoken utterance, each of the interpretations including a corresponding intent, one or more corresponding parameters associated with the corresponding intent, and one or more corresponding slot values for each of the one or more corresponding parameters, and each of the interpretations including at least one unique corresponding slot value; generating, based on the assistant input data, metric data that characterizes a predicted degree of correspondence between each of the plurality of interpretations and the assistant command that is included in the spoken utterance; causing, based on the metric data and the assistant input data, the automated assistant to automatically initialize performance of a first operation associated with a first interpretation, of the plurality of interpretations, to fulfill the assistant command included in the spoken utterance; and causing, based on the metric data and the assistant input data, one or more selectable suggestion elements to be rendered at a display interface of the computing device, each of the one or more selectable suggestion elements being associated with a corresponding alternative interpretation, of the plurality of interpretations, to fulfill the assistant command included in the spoken utterance. A user selection of a given selectable suggestion element, of the one or more selectable suggestion elements, causes the automated assistant to initialize performance of the corresponding alternative operation associated with the given selectable suggestion element.

These and other implementations of technology disclosed herein can optionally include one or more of the following features.

In some implementations, causing the automated assistant to automatically initialize performance of the first operation to fulfill the assistant command included in the spoken utterance may cause a first application to generate an instance of particular content.

In some implementations, the method may further include, in response to causing the automated assistant to automatically initialize performance of the first operation to fulfill the assistant command included in the spoken utterance, causing an automatic speech recognition (ASR) process or a natural language understanding (NLU) process to be biased toward content associated with the one or more selectable suggestion elements.

In some implementations, the method may further include causing, based on the metric data and the assistant input data, the automated assistant to access application data in furtherance of preparing to fulfill the corresponding alternative operations associated with the one or more selectable suggestion elements.

In some implementations, the method may further include determining, based on the spoken utterance, that one or more of the corresponding slot values for one or more of the corresponding parameters associated with the plurality of interpretations was not specified by the user via the spoken utterance. The automated assistant may infer a particular slot value for one or more of the corresponding parameters associated with the first interpretation. In some versions of those implementations, the method may further include inferring, based on the spoken utterance, an alternative particular slot value for each of the corresponding alternative interpretations. The user selection of the given selectable suggestion element may cause the alternative operation to be initialized using the alternative particular slot value. In some further versions of those implementations, the particular slot value may identify a first application for rendering particular content, and the alternative particular slot value may identify a different, second application for rendering alternative particular content. In some further additional or alternative versions of those implementations, the particular slot value may identify a first entity reference for rendering particular content, and wherein the alternative particular slot value may identify a different, second entity reference for rendering alternative particular content.

In some implementations, causing the one or more selectable suggestion elements to be rendered at the display interface of the computing device may include causing the one or more selectable suggestion elements to be rendered at the display interface of the computing device for a threshold duration of time subsequent to causing the automated assistant to automatically initialize performance of the first operation to fulfill the assistant command included in the spoken utterance.

In some implementations, a method implemented by one or more processors is provided, and includes receiving, at a computing device, a spoken utterance of a user that is directed to an automated assistant, the spoken utterance including an assistant command to be fulfilled by the automated assistant; generating, based on the spoken utterance, metric data that identifies a first metric characterizing a degree to which a first operation is predicted to satisfy the assistant command, and a second metric characterizing another degree to which a second operation is predicted to satisfy the assistant command; generating, based on the first operation and the second operation, graphical user interface (GUI) data that characterizes an assistant GUI that is responsive to the spoken utterance; causing, in response to receiving the spoken utterance, the automated assistant to automatically initialize performance of the first operation; and causing a display interface of the computing device to render the assistant GUI according to the GUI data and the metric data. The GUI data is generated to identify a first selectable element and a second selectable element, and the first selectable element is selectable to control performance of the first operation and the second selectable element is selectable to automatically initialize performance of the second operation.

These and other implementations of technology disclosed herein can optionally include one or more of the following features.

In some implementations, at the assistant GUI, the first selectable element may be arranged more prominently than the second selectable element when the degree to which the first operation is predicted to satisfy the assistant command is greater than the other degree to which the second operation is predicted to satisfy the assistant command.

In some implementations, causing the display interface to render the assistant GUI according to the GUI data and the metric data may include causing the first selectable element to be arranged adjacent to the second selectable element. At the assistant GUI, a first area of the first selectable element may be greater than a second area of the second selectable element when the degree to which the first operation is predicted to satisfy the assistant command is greater than the other degree to which the second operation is predicted to satisfy the assistant command.

In some implementations, causing the display interface to render the assistant GUI according to the GUI data and the metric data may include causing the first selectable element to be arranged adjacent to the second selectable element. At the assistant GUI, the first selectable element may be arranged according to first arrangement data that is specific to the first selectable element and that characterizes a corresponding first position of the first selectable element at the assistant GUI, and the second selectable element may be arranged according to second arrangement data that is specific to the second selectable element and that characterizes a corresponding second position of the second selectable element at the assistant GUI.

In some implementations, at the assistant GUI, the first selectable element may be displayed based on corresponding first display data that is specific to the first selectable element and that characterizes corresponding first display characteristics of the first selectable element at the assistant GUI, and the second selectable element may be displayed based on corresponding second display data that is specific to the second selectable element and that characterizes corresponding second display characteristics of the second selectable element at the assistant GUI.

In some implementations, the first operation may be a particular operation to be performed at the computing device and the second operation may be the particular operation to be performed at a separate computing device. Further, a user selection of the second selectable element may cause the particular operation to be initialized at the separate computing device.

In some implementations, the second selectable element may be selectable via a touch input at the display interface of the computing device when the first operation is being executed.

In some implementations, the second selectable element may be selectable via an additional spoken utterance simultaneous to the first operation being executed.

In some implementations, at the assistant GUI, a prominence of a rendering of the first selectable element relative to the second selectable element may be based on a difference between the first metric and the second metric. In some versions of those implementations, the second selectable element may not be rendered at the display interface when the difference between the first metric and the second metric does not satisfy a suggestion threshold, and a particular touch gesture provided by the user to the display interface of the computing device may cause the second selectable element to be rendered at the display interface of the computing device.

In some implementations, a method implemented by one or more processors is provided, and includes receiving, at a computing device, a spoken utterance of a user that is directed to an automated assistant, the spoken utterance including an assistant command to be fulfilled by the automated assistant; identifying, in response to receiving the spoken utterance, a first operation capable of being initialized by the automated assistant to fulfill the assistant command; automatically initializing performance of the first operation in response to the spoken utterance; identifying, based on a degree to which the first operation is predicted to be responsive to the spoken utterance, at least a second operation capable of being initialized by the automated assistant to fulfill the assistant command; and causing, based on the spoken utterance, a display interface of the computing device to render at least a second selectable element associated with the second operation that, when selected, causes the automated assistant to initialize the second operation in lieu of the first operation.

These and other implementations of technology disclosed herein can optionally include one or more of the following features.

In some implementations, identifying at least the second operation capable of being initialized by the automated assistant to fulfill the assistant command may include generating a metric that characterizes the degree to which the first operation is predicted to be responsive to the spoken utterance, and determining whether the metric satisfies a metric threshold. The automated assistant may identify at least the second operation for suggesting to the user when the metric does not satisfy the metric threshold.

In some implementations, identifying at least the second operation capable of being initialized by the automated assistant to fulfill the assistant command may include determining whether the first operation is a particular type of operation. The automated assistant may determine to identify at least the second operation when the first operation is the particular type of operation, and the second operation identified may be a different type of operation than the particular type of operation of the first operation. In some versions of those implementations, the particular type of operation may include a communication operation that involves communicating with a different user.

In some implementations, the method may further include, in response to receiving a user selection of the second selectable element, causing performance of the first operation to be terminated.

In some implementations, identifying at least the second operation capable of being initialized by the automated assistant to fulfill the assistant command may include determining a quantity of additional operations to identify for suggesting to the user via the display interface of the computing device. In some versions of those implementations, determining the quantity of additional operations to identify for suggesting to the user via the display interface of the computing device may be based on a size of the display interface of the computing device. In some additional or alternative versions of those implementations, determining the quantity of additional operations to identify for suggesting to the user via the display interface of the computing device may be based on a corresponding metric that characterizes a corresponding degree to which each of the additional operations are predicted to be responsive to the spoken utterance.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
   receiving, at a computing device, a spoken utterance of a user that is directed to an automated assistant, the spoken utterance including an assistant command to be fulfilled by the automated assistant;
   generating, based on the spoken utterance, assistant input data that characterizes a plurality of interpretations that are predicted to be responsive to the spoken utterance, each of the interpretations including a corresponding intent, one or more corresponding parameters associated with the corresponding intent, and one or more corresponding slot values for each of the one or more corresponding parameters, and each of the interpretations including at least one unique corresponding slot value;
   generating, based on the assistant input data, metric data that characterizes a predicted degree of correspondence between each of the plurality of interpretations and the assistant command that is included in the spoken utterance;
   causing, based on the metric data and the assistant input data, the automated assistant to automatically initialize performance of a first operation associated with a first interpretation, of the plurality of interpretations, to fulfill the assistant command included in the spoken utterance; and
   causing, based on the metric data and the assistant input data, one or more selectable suggestion elements to be rendered at a display interface of the computing device, each of the one or more selectable suggestion elements being associated with a corresponding alternative interpretation, of the plurality of interpretations, to fulfill the assistant command included in the spoken utterance,
      wherein a user selection of a given selectable suggestion element, of the one or more selectable suggestion elements, causes the automated assistant to initialize performance of the corresponding alternative operation associated with the given selectable suggestion element, and
      wherein causing the one or more selectable suggestion elements to be rendered at the display interface of the computing device comprises:
         causing the one or more selectable suggestion elements to be rendered at the display interface of the computing device for a threshold duration of time subsequent to causing the automated assistant to automatically initialize performance of the first operation to fulfill the assistant command included in the spoken utterance; and
         in response to determining that the threshold duration of time has lapsed:
            causing the one or more selectable suggestion elements to be removed from rendering at the display interface of the computing device.

2. The method of claim 1,
   wherein causing the automated assistant to automatically initialize performance of the first operation to fulfill the assistant command included in the spoken utterance causes a first application to generate an instance of particular content.

3. The method of claim 1, further comprising:
   in response to causing the automated assistant to automatically initialize performance of the first operation to fulfill the assistant command included in the spoken utterance:

causing an automatic speech recognition (ASR) process or a natural language understanding (NLU) process to be biased toward content associated with the one or more selectable suggestion elements.

4. The method of claim 1, further comprising:
causing, based on the metric data and the assistant input data, the automated assistant to access application data in furtherance of preparing to fulfill the corresponding alternative operations associated with the one or more selectable suggestion elements.

5. The method of claim 1, further comprising:
determining, based on the spoken utterance, that one or more of the corresponding slot values for one or more of the corresponding parameters associated with the plurality of interpretations was not specified by the user via the spoken utterance,
wherein the automated assistant infers a particular slot value for one or more of the corresponding parameters associated with the first interpretation.

6. The method of claim 5, further comprising:
inferring, based on the spoken utterance, an alternative particular slot value for each of the corresponding alternative interpretations,
wherein the user selection of the given selectable suggestion element causes the alternative operation to be initialized using the alternative particular slot value.

7. The method of claim 6, wherein the particular slot value identifies a first application for rendering particular content, and wherein the alternative particular slot value identifies a different, second application for rendering alternative particular content.

8. The method of claim 6, wherein the particular slot value identifies a first entity reference for rendering particular content, and wherein the alternative particular slot value identifies a different, second entity reference for rendering alternative particular content.

9. A system comprising:
at least one processor; and
memory storing instructions that, when executed, cause the at least one processor to be operable to:
receive, at a computing device, a spoken utterance of a user that is directed to an automated assistant, the spoken utterance including an assistant command to be fulfilled by the automated assistant;
generate, based on the spoken utterance, assistant input data that characterizes a plurality of interpretations that are predicted to be responsive to the spoken utterance, each of the interpretations including a corresponding intent, one or more corresponding parameters associated with the corresponding intent, and one or more corresponding slot values for each of the one or more corresponding parameters, and each of the interpretations including at least one unique corresponding slot value;
generate, based on the assistant input data, metric data that characterizes a predicted degree of correspondence between each of the plurality of interpretations and the assistant command that is included in the spoken utterance;
cause, based on the metric data and the assistant input data, the automated assistant to automatically initialize performance of a first operation associated with a first interpretation, of the plurality of interpretations, to fulfill the assistant command included in the spoken utterance; and cause, based on the metric data and the assistant input data, one or more selectable suggestion elements to be rendered at a display interface of the computing device, each of the one or more selectable suggestion elements being associated with a corresponding alternative interpretation, of the plurality of interpretations, to fulfill the assistant command included in the spoken utterance,
wherein a user selection of a given selectable suggestion element, of the one or more selectable suggestion elements, causes the automated assistant to initialize performance of the corresponding alternative operation associated with the given selectable suggestion element, and
wherein, in causing the one or more selectable suggestion elements to be rendered at the display interface of the computing device, the at least one processor is operable to:
cause the one or more selectable suggestion elements to be rendered at the display interface of the computing device for a threshold duration of time subsequent to causing the automated assistant to automatically initialize performance of the first operation to fulfill the assistant command included in the spoken utterance; and
in response to determining that the threshold duration of time has lapsed:
cause the one or more selectable suggestion elements to be removed from rendering at the display interface of the computing device.

10. The system of claim 9,
wherein causing the automated assistant to automatically initialize performance of the first operation to fulfill the assistant command included in the spoken utterance causes a first application to generate an instance of particular content.

11. The system of claim 9, wherein the at least processor is further operable to:
in response to causing the automated assistant to automatically initialize performance of the first operation to fulfill the assistant command included in the spoken utterance:
cause an automatic speech recognition (ASR) process or a natural language understanding (NLU) process to be biased toward content associated with the one or more selectable suggestion elements.

12. The system of claim 9, wherein the at least processor is further operable to:
cause, based on the metric data and the assistant input data, the automated assistant to access application data in furtherance of preparing to fulfill the corresponding alternative operations associated with the one or more selectable suggestion elements.

13. The system of claim 9, wherein the at least processor is further operable to:
determine, based on the spoken utterance, that one or more of the corresponding slot values for one or more of the corresponding parameters associated with the plurality of interpretations was not specified by the user via the spoken utterance,
wherein the automated assistant infers a particular slot value for one or more of the corresponding parameters associated with the first interpretation.

14. The system of claim 13, wherein the at least processor is further operable to:
infer, based on the spoken utterance, an alternative particular slot value for each of the corresponding alternative interpretations,
wherein the user selection of the given selectable suggestion element causes the alternative operation to be initialized using the alternative particular slot value.

15. The system of claim 14, wherein the particular slot value identifies a first application for rendering particular content, and wherein the alternative particular slot value identifies a different, second application for rendering alternative particular content.

16. The system of claim 14, wherein the particular slot value identifies a first entity reference for rendering particular content, and wherein the alternative particular slot value identifies a different, second entity reference for rendering alternative particular content.

17. A non-transitory computer-readable storage medium storing instructions that, when executed, cause at least one processor to perform operations, the operations comprising:
receiving, at a computing device, a spoken utterance of a user that is directed to an automated assistant, the spoken utterance including an assistant command to be fulfilled by the automated assistant;
generating, based on the spoken utterance, assistant input data that characterizes a plurality of interpretations that are predicted to be responsive to the spoken utterance, each of the interpretations including a corresponding intent, one or more corresponding parameters associated with the corresponding intent, and one or more corresponding slot values for each of the one or more corresponding parameters, and each of the interpretations including at least one unique corresponding slot value;
generating, based on the assistant input data, metric data that characterizes a predicted degree of correspondence between each of the plurality of interpretations and the assistant command that is included in the spoken utterance;
causing, based on the metric data and the assistant input data, the automated assistant to automatically initialize performance of a first operation associated with a first interpretation, of the plurality of interpretations, to fulfill the assistant command included in the spoken utterance; and
causing, based on the metric data and the assistant input data, one or more selectable suggestion elements to be rendered at a display interface of the computing device, each of the one or more selectable suggestion elements being associated with a corresponding alternative interpretation, of the plurality of interpretations, to fulfill the assistant command included in the spoken utterance,
wherein a user selection of a given selectable suggestion element, of the one or more selectable suggestion elements, causes the automated assistant to initialize performance of the corresponding alternative operation associated with the given selectable suggestion element, and
wherein causing the one or more selectable suggestion elements to be rendered at the display interface of the computing device comprises:
causing the one or more selectable suggestion elements to be rendered at the display interface of the computing device for a threshold duration of time subsequent to causing the automated assistant to automatically initialize performance of the first operation to fulfill the assistant command included in the spoken utterance; and
in response to determining that the threshold duration of time has lapsed:
causing the one or more selectable suggestion elements to be removed from rendering at the display interface of the computing device.

18. The non-transitory computer-readable storage medium of claim 17,
wherein causing the automated assistant to automatically initialize performance of the first operation to fulfill the assistant command included in the spoken utterance causes a first application to generate an instance of particular content.

19. The non-transitory computer-readable storage medium of claim 17, the operations further comprising:
causing, based on the metric data and the assistant input data, the automated assistant to access application data in furtherance of preparing to fulfill the corresponding alternative operations associated with the one or more selectable suggestion elements.

20. The non-transitory computer-readable storage medium of claim 17, the operations further comprising:
determining, based on the spoken utterance, that one or more of the corresponding slot values for one or more of the corresponding parameters associated with the plurality of interpretations was not specified by the user via the spoken utterance,
wherein the automated assistant infers a particular slot value for one or more of the corresponding parameters associated with the first interpretation; and
inferring, based on the spoken utterance, an alternative particular slot value for each of the corresponding alternative interpretations,
wherein the user selection of the given selectable suggestion element causes the alternative operation to be initialized using the alternative particular slot value.

* * * * *